US012625098B2

(12) United States Patent
Girmonsky et al.

(10) Patent No.: US 12,625,098 B2
(45) Date of Patent: May 12, 2026

(54) NON-DESTRUCTIVE CLASSIFICATION OF SPECIMENS BASED ON ENERGY SIGNATURE MEASUREMENTS

(71) Applicant: APPLIED MATERIALS ISRAEL LTD., Rehovot (IL)

(72) Inventors: Doron Girmonsky, Raanana (IL); Uri Hadar, Tel Aviv (IL); Dror Shemesh, Hod Hasharon (IL); Michal Eilon, Beit-Elazari (IL)

(73) Assignee: Applied Materials Israel Ltd., Rehovot (IL)

( * ) Notice: Subject to any disclaimer, the term of this patent is extended or adjusted under 35 U.S.C. 154(b) by 597 days.

(21) Appl. No.: 18/103,238

(22) Filed: Jan. 30, 2023

(65) Prior Publication Data

US 2024/0255449 A1      Aug. 1, 2024

(51) Int. Cl.
*G01N 23/2252*      (2018.01)

(52) U.S. Cl.
CPC ................................. *G01N 23/2252* (2013.01)

(58) Field of Classification Search
USPC ........................................ 250/307, 310, 305
See application file for complete search history.

(56) References Cited

U.S. PATENT DOCUMENTS

| | | | |
|---|---|---|---|
| 4,634,868 A | | 1/1987 | Delacy |
| 5,210,414 A | * | 5/1993 | Wallace ............... G01N 1/2202 |
| | | | 250/307 |
| 5,412,210 A | | 5/1995 | Todokoro et al. |
| 6,670,610 B2 | | 12/2003 | Shemesh et al. |
| 7,186,977 B2 | * | 3/2007 | Martin ............... G01N 23/2252 |
| | | | 250/306 |
| 8,232,523 B2 | | 7/2012 | Boughorbel et al. |
| 8,581,189 B2 | | 11/2013 | Boughorbel et al. |
| 8,709,269 B2 | | 4/2014 | Shemesh |
| 9,625,398 B1 | | 4/2017 | Campbell et al. |

(Continued)

FOREIGN PATENT DOCUMENTS

| | | |
|---|---|---|
| EP | 2557587 B1 | 10/2015 |
| EP | 3297018 B1 | 3/2019 |

OTHER PUBLICATIONS

U.S. Appl. No. 17/901,705, "Non-Final Office Action", Feb. 10, 2025, 27 pages.

(Continued)

*Primary Examiner* — Kiet T Nguyen
(74) *Attorney, Agent, or Firm* — Kilpatrick Townsend & Stockton LLP

(57)      ABSTRACT

Disclosed herein is a system for non-destructive classification of specimens. The system includes an e-beam source, an X-ray measurement module, and a computational module. The e-beam source is configured to project e-beams on a specimen at one or more e-beam landing energies, so as to penetrate the specimen and induce emission of X-rays. The X-ray measurement module is configured to measure the emitted X-rays. The computational module is configured to process the measurement data to obtain an energy signature of at least one target substance included in the specimen and (Continued)

For each at least one e-beam landing energy:

Inspecting a specimen, which is to be classified, by projecting an e-beam thereon. The e-beam is configured to penetrate the inspected specimen.      — 110a Obtaining measurement data by measuring X-rays emitted from the inspected specimen due to the penetration of the e-beam.      — 110b

— 110

Processing the measurement data to obtain an energy signature of at least one target substance included in the inspected specimen. The energy signature is indicative of a dependence on the e-beam landing energy of an intensity of the emitted X-rays about each of at least one characteristic X-ray line of the at least one target substance, respectively.      — 120a Classifying the inspected specimen based on the obtained energy signature and one or more reference energy signatures pertaining to one or more reference specimens, respectively.      — 120b

— 120

— 100 classify the inspected specimen based on the obtained energy signature and one or more reference energy signatures pertaining to one or more reference specimens, respectively.

16 Claims, 9 Drawing Sheets

(56) References Cited

U.S. PATENT DOCUMENTS

| | | | |
|---|---|---|---|
| 10,354,418 | B2 | 7/2019 | Recur et al. |
| 10,928,336 | B1 | 2/2021 | Shemesh |
| 11,264,202 | B2 | 3/2022 | Chirko et al. |
| 11,321,835 | B2 | 5/2022 | Levant et al. |
| 11,404,244 | B1 | 8/2022 | Zur |
| 11,543,368 | B2 | 1/2023 | Shemesh |
| 2010/0196296 | A1 | 8/2010 | Geissler et al. |
| 2012/0180859 | A1 | 7/2012 | Lee et al. |
| 2013/0228683 | A1 | 9/2013 | Boughorbel et al. |
| 2014/0117229 | A1* | 5/2014 | Owen ............... H01J 37/252 250/305 |
| 2016/0245762 | A1* | 8/2016 | Owen ............... H01J 37/244 |
| 2016/0322195 | A1 | 11/2016 | Sender et al. |
| 2020/0194224 | A1 | 6/2020 | Stoschus et al. |
| 2020/0411513 | A1 | 12/2020 | Jambunathan et al. |
| 2021/0356413 | A1 | 11/2021 | Sakamae |
| 2023/0003675 | A1 | 1/2023 | Kaplenko et al. |
| 2023/0279281 | A1 | 9/2023 | Yamashita et al. |
| 2024/0054669 | A1 | 2/2024 | Houben et al. |

OTHER PUBLICATIONS

U.S. Appl. No. 17/947,481, "Non-Final Office Action", Jan. 29, 2025, 30 pages.

Comon, et al., "Handbook of Blind Source Separation", Independent Component Analysis and Applications, Feb. 17, 2010, 65 pages.

Gajowniczek, et al., "Blind Source Separation for the Aggregation of Machine Learning Algorithms: An Arrhythmia Classification Case", Electronics, vol. 9, No. 3 Available online at: https://www.mdpi.com/2079-9292/9/3/425, Mar. 3, 2020, 14 pages.

Hyvarinen, et al., "Independent Component Analysis: Algorithms and Applications", Neural Networks, vol. 13, No. 4-5, Jun. 2000, 31 pages.

U.S. Appl. No. 17/901,705, "Final Office Action", May 27, 2025, 21 pages.

* cited by examiner

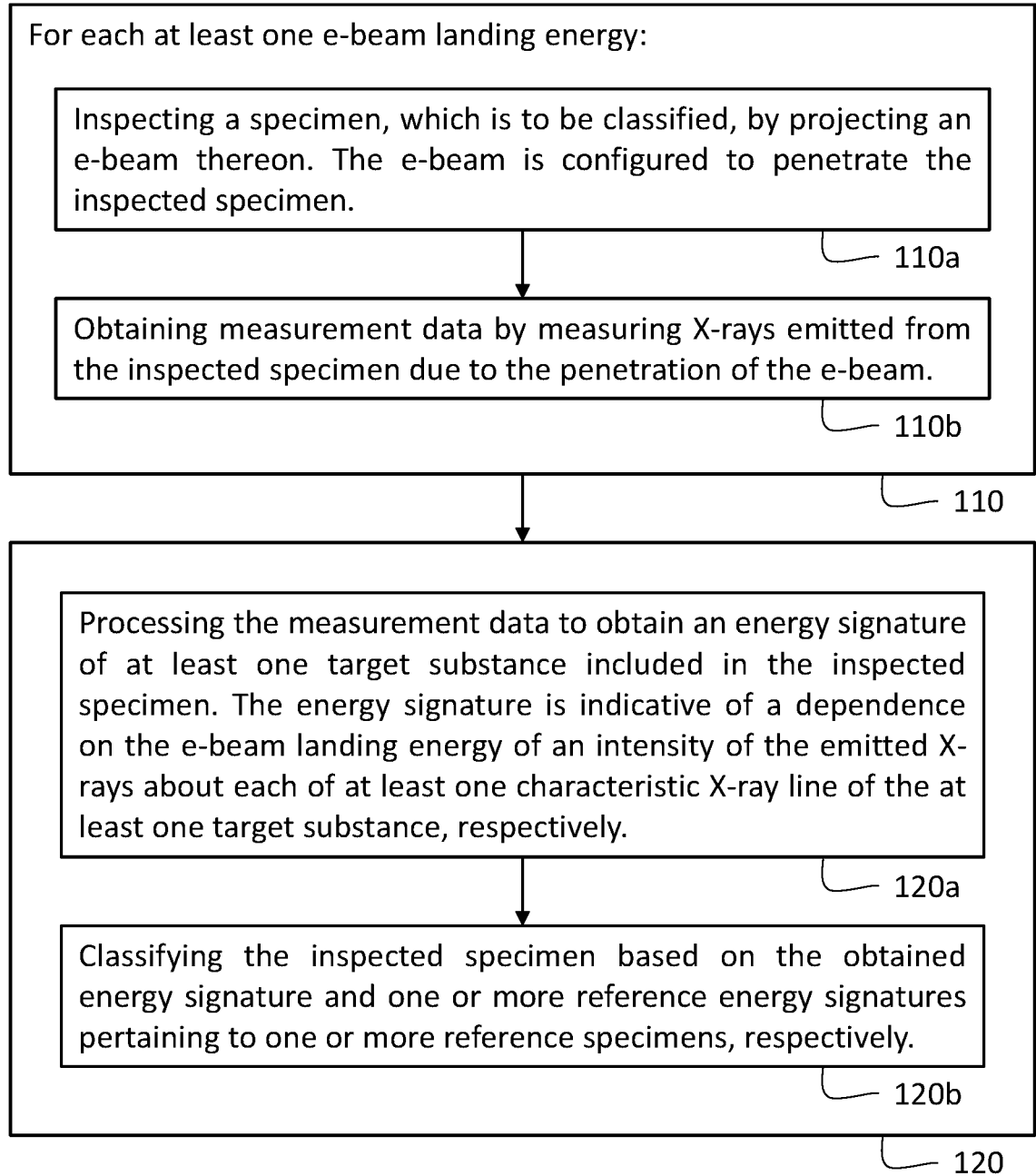

For each at least one e-beam landing energy:

Inspecting a specimen, which is to be classified, by projecting an e-beam thereon. The e-beam is configured to penetrate the inspected specimen.

⌐ 110a

Obtaining measurement data by measuring X-rays emitted from the inspected specimen due to the penetration of the e-beam.

⌐ 110b

⌐ 110

Processing the measurement data to obtain an energy signature of at least one target substance included in the inspected specimen. The energy signature is indicative of a dependence on the e-beam landing energy of an intensity of the emitted X-rays about each of at least one characteristic X-ray line of the at least one target substance, respectively.

⌐ 120a

Classifying the inspected specimen based on the obtained energy signature and one or more reference energy signatures pertaining to one or more reference specimens, respectively.

NON-DESTRUCTIVE CLASSIFICATION OF SPECIMENS BASED ON ENERGY SIGNATURE MEASUREMENTS

TECHNICAL FIELD

The present disclosure relates generally to non-destructive classification of specimens based on energy signature measurements.

BACKGROUND OF THE INVENTION

"Three-dimensional" structures are increasingly used in the semiconductor industry, particularly, in the manufacture of logic and memory components. Accordingly, as part of quality control, "three-dimensional" data of structures within specimens must typically be obtained. At present, most techniques for classification of specimens, which include three-dimensional internal structures, are destructive, and may involve the extraction of lamellas, or shaving off of slices, from a specimen and subsequent inspection thereof using e.g. transmission electron microscopy (TEM). The challenge remains to develop non-destructive techniques for classification of specimens incorporating three-dimensional internal structures, which will allow for high-volume manufacturing (HVM).

BRIEF SUMMARY OF THE INVENTION

Aspects of the disclosure, according to some embodiments thereof, relate to non-destructive classification of specimens based on energy signature measurements. More specifically, but not exclusively, aspects of the disclosure, according to some embodiments thereof, relate to non-destructive classification of structures (e.g. semiconductor structures) based on sensing (i.e. measurement) of X-rays generated as a result of impinging the structures with electron beams.

Thus, according to an aspect of some embodiments, there is provided a computer-based method for non-destructive classification of specimens. The method includes:

A measurement operation including, for each of at least one e-beam landing energy, suboperations of:

Projecting an e-beam on an inspected specimen: The e-beam is configured to penetrate the inspected specimen to a degree dependent on the e-beam landing energy.

Obtaining measurement data by measuring X-rays emitted from the inspected specimen due to the penetration of the e-beam.

A data analysis operation including suboperations of:

Processing the measurement data to obtain an energy signature of at least one target substance which the inspected specimen includes: The energy signature is indicative of a dependence on the e-beam landing energy of an intensity of the emitted X-rays about each of at least one characteristic X-ray line of the at least one target substance, respectively.

Classifying the inspected specimen based on the measured energy signature and one or more reference energy signatures pertaining to one or more reference specimens, respectively.

According to some embodiments of the method, the one or more reference specimens include two or more reference specimens. In the suboperation of classifying the inspected specimen, the inspected specimen is classified as being in one of two or more classes corresponding to the two or more reference specimens, respectively.

According to some embodiments of the method, in the suboperation of classifying the inspected specimen the inspected specimen is classified as being in a same class as one of the one or more reference specimens or not being in any of the classes.

According to some embodiments of the method, the one or more reference specimens include $K \geq 2$ reference specimens. In the suboperation of classifying the inspected specimen, the inspected specimen is classified as being in one of K+1 classes: a first K (i.e., 1 to K) classes of the K+1 classes correspond to the K reference specimens, respectively, and the remaining (i.e. (K+1)-th) class corresponds to the specimen not being in any one of the first K classes.

According to some embodiments of the method, the one or more reference energy signatures are generated based on reference data obtained by: (i) profiling one or more groups of specimens, each group including specimens of a same respective design intent, and/or (ii) simulating one or more specimens of one or more design intents, respectively.

According to some embodiments of the method, the data analysis operation further includes computing a confidence of the classification of the inspected specimen.

According to some embodiments of the method, the suboperation of classifying the inspected specimen includes computing one or more distances between the measured energy signature and the one or more reference energy signatures, respectively.

According to some embodiments of the method, for each of the at least one target substance and for each e-beam landing energy, the suboperation of measuring the emitted X-rays includes measuring an X-ray emission spectrum in a photon energy range including the characteristic X-ray line of the target substance.

According to some embodiments of the method, in order to obtain the energy signature, or as part of obtaining the energy signature, onto each of the one or more obtained spectra a free curve is fitted, thereby obtaining a respective optimized curve. Either the one or more obtained spectra are the measured X-ray emission spectra, respectively, or for each e-beam landing energy a spectral difference between the respective measured X-ray emission spectrum and a respective control spectrum is computed, and the one or more obtained spectra are the spectral differences, respectively.

According to some embodiments of the method, the control spectra are of a gold standard specimen or of another specimen of the same intended design as the inspected specimen but in an earlier stage in a fabrication process thereof.

According to some embodiments of the method, wherein the one or more obtained spectra are the measured X-ray emission spectra, respectively, the free curve is proportional to a bulge-shaped function, or the free curve is a sum of functions, which includes a bulge-shaped function. In the fitting of the free curve, the bulge-shaped function is fitted onto a peak about the characteristic X-ray line.

According to some embodiments of the method, the bulge-shaped function is up to a proportionality parameter a gaussian-like function, a gamma-like distribution, or a generalized gaussian-like distribution. (When the bulge-shaped function is a cap-shaped function, the proportionality constant is positive, and when the bulge-shaped function is cup-shaped, the proportionality constant is negative.)

According to some embodiments of the method, wherein the one or more obtained spectra are the measured X-ray emission spectra, respectively, the sum of functions further includes a second function, which is a polynomial. In in the fitting of the free curve, the second function is fitted onto a bremsstrahlung component of the respective measured X-ray emission spectrum.

According to some embodiments of the method, N is a number of the at least one e-beam landing energy and M is a number of the at least one target substance. In the suboperation of processing the measurement data, from each of the fitted bulge-shaped functions an intensity of the emitted X-rays about the respective characteristic X-ray line is determined. The energy signature is an M·N component vector with components thereof constituted by (i) M·N computed intensity values, respectively, or (ii) M·N functions with each function depending on a respective one of the M·N computed intensity values and, when the one or more obtained spectra are the measured X-ray emission spectra, respectively, also the fitted parameters of the respective second function.

According to some embodiments of the method, each of the M·N computed intensity values is obtained by minimizing a respective cost function including a distance between the respective obtained spectrum and the respective free curve. The minimization is over adjustable parameters of the free curve.

According to some embodiments of the method, the M·N computed intensity values are obtained by minimizing a cost function including a sum of M·N distances between the M N obtained spectra and the M·N free curves, respectively. The minimization is joint over adjustable parameters of free curve.

According to some embodiments of the method, wherein the data analysis operation further includes computing the confidence of the classification, the photon energy range includes a photon energy subrange wherein each of M·N spectral segments of the M·N obtained spectra, respectively, does not include significant peaks nor significant dips. The computing of the confidence includes a suboperation of processing the M·N spectral segments to estimate noise. The confidence is computed taking into account the estimated noise.

According to some embodiments of the method, the at least one target substance comprises at least one semiconductor material.

According to some embodiments of the method, wherein the one or more obtained spectra are the spectral differences, respectively, the inspected specimen includes a bulk and the at least one target substance includes a material introduced into the bulk following fabrication of the bulk. For each e-beam landing energy, the respective control spectrum is of a bulk of a same design as the bulk of the inspected specimen.

According to some embodiments of the method, the bulk is or includes a semiconductor structure.

According to some embodiments of the method, the introduced material includes fluorine, nitrogen, boron, and/or gallium.

According to some embodiments of the method, wherein the inspected specimen includes the bulk and the introduced material, each of the spectral differences further includes a respective dip centered about a characteristic X-ray line of a second material. The second material has a lower concentration in the inspected specimen than in the bulk prior to the insertion of the introduced material. According to some such embodiments of the method, the free curve is a sum of functions including a cap-shaped function (which is fitted about the peak) and an additional function, which is cup-shaped and which is fitted about the dip.

According to some embodiments of the method, the inspected specimen is a patterned wafer.

According to an aspect of some embodiments, there is provided a system for non-destructive classification of specimens. The system includes:

An electron beam (e-beam) source configured to project e-beams on a specimen being inspected at one or more e-beam landing energies: The e-beams are configured to penetrate the inspected specimen and induce emission of X-rays.

An X-ray measurement module (i.e., X-ray measurement equipment) configured to obtain measurement data by measuring the emitted X-rays.

A computational module configured to:

Process the measurement data to obtain an energy signature of at least one target substance included in the inspected specimen: The energy signature is indicative of a dependence on the e-beam landing energy of an intensity of the emitted X-rays about each of at least one characteristic X-ray line of the at least one target substance, respectively.

Classify the inspected specimen based on the measured energy signature and one or more reference energy signatures pertaining to one or more reference specimens, respectively.

According to some embodiments of the system, the one or more reference specimens include two or more reference specimens. The computational module is configured to classify the inspected specimen as being in one of two or more classes corresponding to the two or more reference specimens, respectively.

According to some embodiments of the system, computational module is configured to classify the inspected specimen as being in a same class as one of the one or more reference specimens or not being in any of the classes.

According to some embodiments of the system, the one or more reference specimens include K≥2 reference specimens. The computational module is configured to classify the inspected specimen as being in one of K+1 classes: A first K (i.e., 1 to K) classes of the K+1 classes correspond to the K reference specimens, respectively, and a remaining (i.e., (K+1)-th) class corresponds to the specimen not being in any one of the first K classes.

According to some embodiments of the system, the computational module is further configured to compute a confidence of the classification of the inspected specimen.

According to some embodiments of the system, in order to classify the inspected specimen, the computational module is configured to compute one or more distances between the measured energy signature and the one or more reference energy signatures, respectively.

According to some embodiments of the system, the X-ray measurement module is configured to measure at least one spectrum of the emitted X-rays in at least one photon energy range including at least one characteristic X-ray line of the at least one target substance, respectively.

According to some embodiments of the system, in order to obtain the energy signature, or as part of obtaining the energy signature, the computational module is configured to fit a free curve onto each of one or more obtained spectra, thereby obtaining a respective optimized curve.

Either (i) the one or more obtained spectra are the measured X-ray emission spectra, respectively, or (ii) the computational module is further configured to, for each e-beam landing energy, compute a spectral difference between the respective measured X-ray emission spectrum and a respective control spectrum, and the obtained spectra are the spectral differences, respectively.

According to some embodiments of the system, the control spectra are of a gold standard specimen or of another specimen of the same intended design as the inspected specimen but in an earlier stage in a fabrication process thereof.

According to some embodiments of the system, wherein the one or more obtained spectra are the measured X-ray emission spectra, respectively, the free curve is proportional to a cap-shaped function, or the free curve is a sum of functions, which includes a cap-shaped function. The computational module is further configured to fit the cap-shaped function onto a peak about the characteristic X-ray line.

According to some embodiments of the system, the bulge-shaped function is up to a proportionality parameter a gaussian-like function, a gamma-like distribution, or a generalized gaussian-like distribution. (When the bulge-shaped function is a cap-shaped function, the proportionality constant is positive, and when the bulge-shaped function is cup-shaped, the proportionality constant is negative.)

According to some embodiments of the system, wherein the one or more obtained spectra are the measured X-ray emission spectra, respectively, the sum of functions further includes a second function, which is a polynomial. The computational module is further configured to fit the second function onto a bremsstrahlung component of the respective measured X-ray emission spectrum.

According to some embodiments of the system, N is a number of the at least one e-beam landing energy and M is a number of the at least one target substance. The computational module is configured to, from each of the fitted bulge-shaped functions, determine an intensity of the emitted X-rays about the respective characteristic X-ray line. The energy signature is an $M \cdot N$ component vector with components thereof constituted by (i) $M \cdot N$ computed intensity values, respectively, or (ii) $M \cdot N$ functions with each function depending on a respective one of the $M \cdot N$ computed intensity values and, when the one or more obtained spectra are the measured X-ray emission spectra, respectively, also the fitted parameters of the respective second function.

According to some embodiments of the system, the computational module is configured to compute each of the $M \cdot N$ intensity values by minimizing a respective cost function including a distance between the respective obtained spectrum and the respective free curve. The minimization is over adjustable parameters of the free curve.

According to some embodiments of the system, the computational module is configured to compute each of the $M \cdot N$ intensity values by minimizing a cost function including a sum of $M \cdot N$ distances between the $M \cdot N$ obtained spectra and the $M \cdot N$ free curves, respectively. The minimization is joint over adjustable parameters of free curve.

According to some embodiments of the system, wherein the computational module is further configured to compute the confidence of the classification, the photon energy range includes a photon energy subrange wherein each of $M \cdot N$ spectral segments of the $M \cdot N$ obtained spectra, respectively, does not include significant peaks nor significant dips. As part of computing the confidence of the classification, the computational module is configured to process the $M \cdot N$ spectral segments to estimate noise.

According to some embodiments of the system, the at least one target substance includes at least one semiconductor material.

According to some embodiments of the system, wherein the one or more obtained spectra are the spectral differences, respectively, the inspected specimen includes a bulk and the at least one target substance includes a material introduced into the bulk following fabrication of the bulk. For each e-beam landing energy, the respective control spectrum is of a bulk of a same design as the bulk of the inspected specimen.

According to some embodiments of the system, wherein the inspected specimen includes the bulk and the introduced material, the bulk is or includes a semiconductor structure. According to some embodiments of the system, the introduced material includes fluorine, nitrogen, boron, and/or gallium.

According to some embodiments of the system, wherein the inspected specimen includes the bulk and the introduced material, each of the spectral differences further includes a respective dip centered about a characteristic X-ray line of a second material. The second material has a lower concentration in the inspected specimen than in the bulk prior to the insertion of the introduced material. According to some such embodiments of the system, the free curve is a sum of functions including the cap-shaped function (which is fitted about the peak) and an additional function, which is cup-shaped. The computational module is further configured to fit the additional function about the dip.

According to some embodiments of the system, the X-ray measurement module includes one or more energy-dispersive X-ray spectrometers and/or one or more wavelength-dispersive X-ray spectrometers.

According to some embodiments of the system, the inspected specimen is a patterned wafer.

According to some embodiments of the system, the computational module includes computer hardware including one or more processors and, optionally, RAM and/or non-volatile memory components. The one or more processors are configured to execute software instructions to classify the inspected specimen. According to some such embodiments, the software instructions may be stored on the non-volatile memory components.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 1 presents a flowchart of a method for non-destructive classification of specimens based on energy signature measurements, according to some embodiments;

DETAILED DESCRIPTION OF THE INVENTION

Figure 2B:
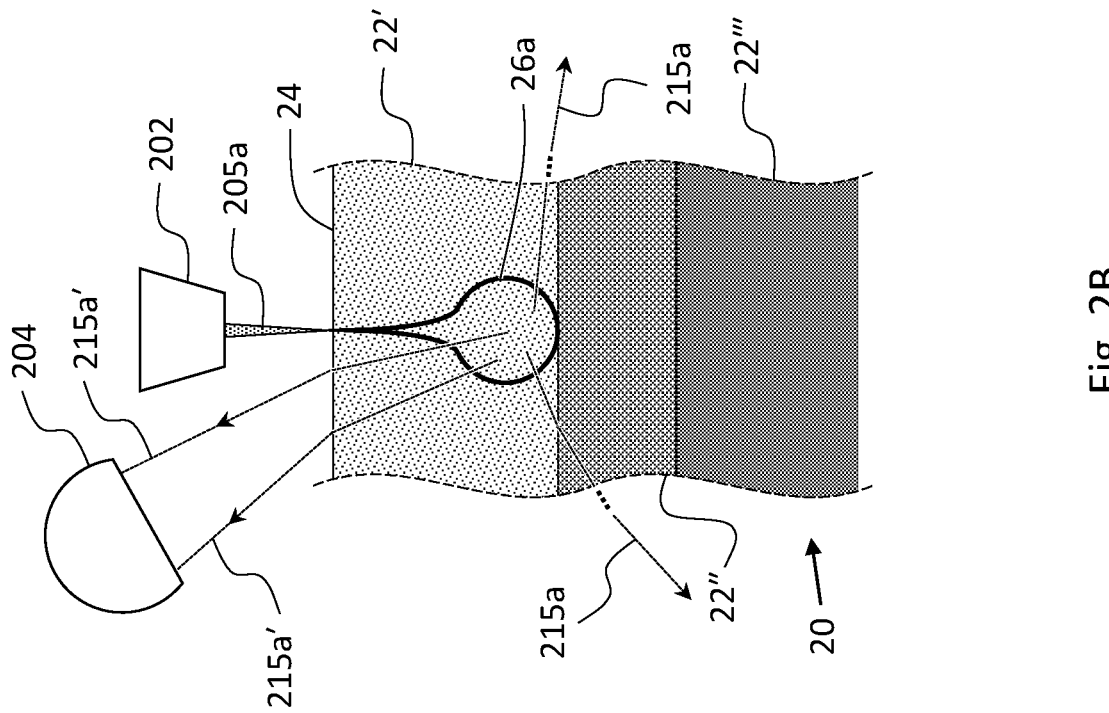
FIGS. 2A to 2D schematically depict a specimen being depth-probed as part of classification thereof in accordance with the method of FIG. 1, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, an estimated quantity or estimated parameter may be said to be "about optimized" or "about optimal" when falling within 5%, 10% or even 20% of the optimal value thereof. Each possibility corresponds to separate embodiments. In particular, the expressions "about optimized" and "about optimal" also cover the case wherein the estimated quantity or estimated parameter is equal to the optimal value of the quantity or the parameter. The optimal value may in principle be obtainable using mathematical optimization software. Thus, for example, an estimated (e.g. an estimated residual) may be said to be "about minimized" or "about minimal/minimum", when the value thereof is no greater than 101%, 105%, 110%, or 120% (or some other pre-defined threshold percentage) of the optimal value of the quantity. Each possibility corresponds to separate embodiments.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol $\bigcirc$ may be used to represent an axis pointing "out of the page", while the symbol $\otimes$ may be used to represent an axis pointing "into the page".

In block diagrams dotted lines connecting elements may be used to represent functional association or at least one-way or two-way communicational association between the connected elements.

As used herein, the term "group" is used in a broad manner to refer to a collection of one or more elements or members. Thus, the term "group" is to be understood as (also) encompassing single-element collections.

As used herein, the term "bulge-shaped function" covers both upward bulging functions and downward bulging functions. More precisely, the term "bulge-shaped function" is defined as a function that either (i) at least roughly resembles a cap (e.g. at least roughly resembles the mathematical intersection symbol ∩)—in which case the function may more specifically be referred to as a "cap-shaped function"- or (ii) at least roughly resembles a cup (e.g. at least roughly resembles the mathematical union symbol ∪)—in which case the function may more specifically be referred to as a "cup-shaped function". Non-limiting examples of cap-shaped functions include functions resembling gaussians and functions resembling concave parabolas. Non-limiting examples of cup-shaped function include functions resembling inverted gaussians and functions resembling convex parabolas.

As used herein, the acronym "SEM" stands for scanning electron microscope. "E-beam" stands for "electron beam".

The present application, according to some embodiments thereof, is directed to methods and systems for non-destructive classification of specimens (e.g., semiconductor specimens). According to some embodiments, e-beams at each of a plurality of (e-beam) landing energies are projected on a specimen, which is to be classified. Each e-beam penetrates into the specimen and excites emission of characteristic X-rays therefrom (and accompanying bremsstrahlung, that is, background radiation). The greater the e-beam landing energy, the greater the depth to which the e-beam penetrates the specimen.

The spectrum of the emitted X-rays depends on the material composition of the specimen and, in particular, the distribution of the different materials making up the specimen. As an e-beam travels through a specimen, the e-beam "probes" different regions it traverses. The contribution of each traversed region to the spectrum of the emitted X-rays depends not only on the concentration of the materials included in the traversed region but also on the energy of the e-beam on entry thereto, which, in turn, decreases with the depth.

Each specimen is characterized by an "energy signature", which, according to some embodiments, may be derived from a set of (characteristic) X-ray emission spectra obtained by probing a specimen with e-beams (one at a time) at each of a plurality of e-beam landing energies. Typically, the uniqueness of the energy signature will increase with the number of e-beam landing energies (according to some embodiments, the energy signature may be an N component vector, wherein N is the number of e-beam landing energies employed). The methods and systems of the present disclosure advantageously utilize this insight for quality control, assessing similarity between different specimens (e.g. fabricated to the same design intent), and, more generally, classifying specimens based on their energy signatures.

As used herein, the term "characteristic X-rays regime" refers to a photon energy range (i.e. an energy range of a photon, or, equivalently, frequency range) within the X-ray spectrum, which includes characteristic X-ray lines.

Specimen Classification Methods

According to an aspect of some embodiments, there is provided a computerized method for non-destructive classification of specimens (e.g. semiconductor structures) based on energy signature measurements. FIG. 1 presents a flowchart of such a method, a method 100, according to some embodiments. Method 100 includes:

A measurement operation 110, which includes, for each of at least one e-beam landing energy, performing:

A suboperation 110a, wherein a specimen, which is to be classified, is inspected by projecting an e-beam on the specimen. The e-beam is configured to penetrate the specimen (henceforth also referred to as the "inspected specimen").

A suboperation 110b, wherein measurement data is obtained by measuring X-rays emitted from the inspected specimen due to the penetration of the e-beam.

A data analysis operation 120, including:

A suboperation 120a, wherein the measurement data is processed to obtain an energy signature of at least one substance (also referred to as "target substance") included in the inspected specimen. The measured energy signature is indicative of a dependence on the e-beam landing energy of an intensity of the emitted X-rays about each of at least one characteristic X-ray line of the at least one substance, respectively.

A suboperation 120b, wherein the inspected specimen is classified based on the measured energy signature and one or more reference energy signatures, which pertain to one or more reference specimens, respectively.

Figure 6:
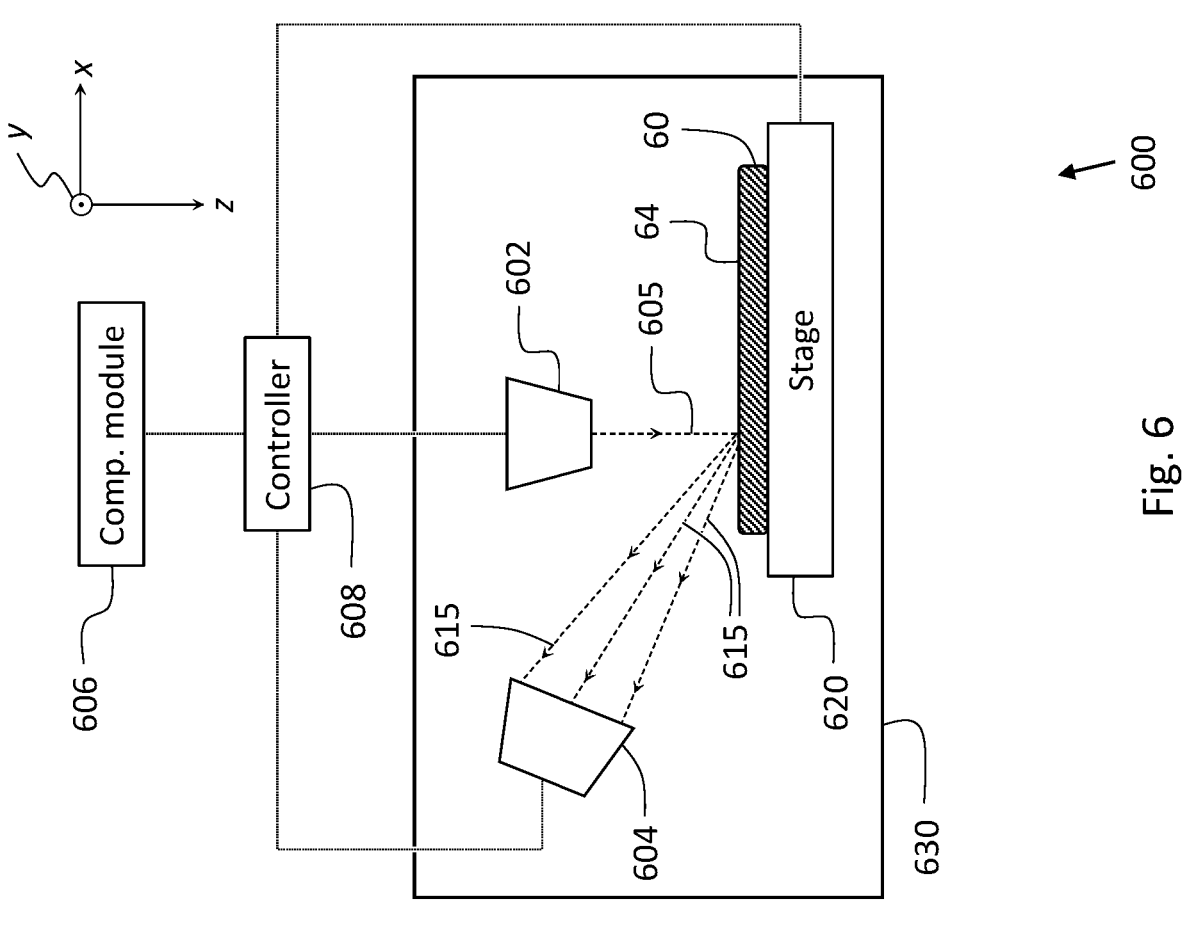
FIG. 6 schematically depicts a system for non-destructive classification of specimens based on energy signature measurements, according to some embodiments.

Method 100 may be implemented using a system, such as the system described below in the description of FIG. 6, or systems similar thereto.

Method 100 may be used to classify specimens according to the material composition thereof and/or the geometry (including internal geometry) thereof.

According to some embodiments, the inspected specimen is a patterned wafer or constitutes a part of a patterned wafer. According to some embodiments, the inspected specimen is a structure including one or more semiconductor materials. According to some such embodiments, the structure may be included in a patterned wafer. According to some embodiments, the inspected specimen may be or include one or more logic components (e.g., a fin FET (FinFET) and/or a gate-all-around (GAA) FET) and/or memory components (e.g., a dynamic RAM and/or a vertical NAND (V-NAND)).

According to some embodiments, in which the one or more reference specimens are constituted by a single reference specimen, method 100 is used to classify whether the inspected specimen is, or is not, in a same class as the reference specimen. According to some embodiments, in which the one or more reference specimens include K≥2 reference specimens, method 100 may be used to classify an inspected specimen to one of K classes. The K classes correspond to the K reference specimens, respectively. Alternatively, according to some embodiments, in which the one or more reference specimens include K≥2 reference specimens, method 100 may be used to classify the inspected specimen to one of K+1 classes: K classes of the K+1 classes correspond to the K reference specimens, respectively. The remaining class corresponds to the inspected specimen not being in a same class as any of the K reference specimens.

According to some embodiments, the one or more reference energy signatures may be obtained by measurement(s) and/or (computer) simulation(s). In the first case, one or more (e.g., K) groups of specimens may be profiled (in the sense of obtaining the energy signature of each specimen in each group). Each group of specimens may include specimens of a same respective design intent (i.e., intended design). According to some embodiments, two groups of specimens may correspond to a same design intent but may differ in the respective fabrication processes thereof. That is, a first group of specimens may include specimens manufactured according to a first fabrication process and a second group of specimens may include specimens manufactured to the same design intent as the specimens in the first group but according to a second fabrication process.

In the latter case (i.e., when the one or more reference energy signatures are obtained using (computer) simulation(s)), the one or more energy signatures may be derived by simulating emission of characteristic X-rays from one or more specimens (e.g., K), respectively. The specimens may differ from one another in the respective design intents and/or (even when intended to be of a same design) in the respective fabrication processes thereof. According to some embodiments, the simulation may include simulation of measurement operation 110 in the sense that the measurement setup, which is used to implement operation 110, is also simulated.

Parameters of the at least one e-beam, particularly the e-beam landing energy (i.e., the landing energy of the e-beam), are selected so as to induce in suboperation 110*a* emission of characteristic X-rays by particles (specifically, particles of the at least one target substance) in a probed region centered about a respective depth, which depends on the e-beam landing energy.

More precisely, each probed region may correspond to a respective volume of the specimen, wherein electrons in the respective e-beam may cause ejections of electrons in the inner shells of atoms (in the probed region), leaving each of these atoms with an inner shell vacancy. The inner shell vacancy may be filled through the relaxation an outer shell electron to the inner shell. The relaxation may be accompanied by emission of a photon (having energy equal to the energy lost by the electron in transitioning from the outer shell to the inner shell).

According to some embodiments, the number of e-beam landing energies, and the minimum and maximum e-beam landing energies, may be selected to ensure that the specimen is probed all over one or more regions based on whose characteristics (e.g., concentrations of target substances therein and/or internal geometry thereof) the specimen is to be classified. According to some such embodiments, the number of e-beam landing energies, and the minimum and maximum e-beam landing energies, may be selected to ensure that the specimen is probed all along the depth-dimension thereof.

According to some embodiments, for each of the at least one target substance and for each e-beam landing energy, in suboperation 110*b* an X-ray emission spectrum in a photon energy range, which includes the characteristic X-ray line of the target substance, is measured. According to some embodiments, suboperation 110*b* may be implemented using an energy-dispersive X-ray (EDX) spectrometer and/or a wavelength-dispersive X-ray (WDX) spectrometer. According to some embodiments, and as elaborated on below in the description of suboperation 120*b*, in order to derive the energy signature, onto each of the X-ray emission spectra a respective curve is fitted.

According to some embodiments, the photon energy range over which the X-ray emission spectra are measured may be narrow in the sense of being limited to a vicinity (e.g., about three times, about five times, or even about ten times the width) of the characteristic X-ray line, or an immediate vicinity of the characteristic X-ray line. According to some embodiments, and as described in more detail below, an X-ray detector and an optical filter may be employed to measure the intensity of the emitted X-rays at or about a characteristic X-ray line of a target substance.

Figure 2A:
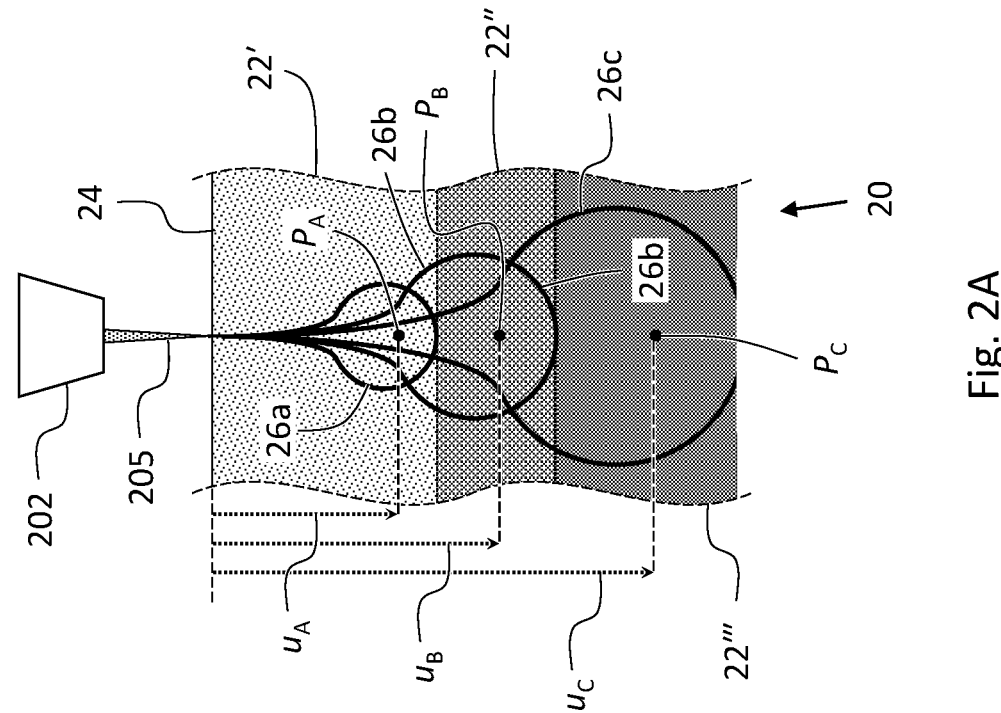

To facilitate the description, reference is additionally made to FIGS. 2A-2D. FIGS. 2A-2D schematically depict an implementation of measurement operation 110 of method 100, according to some embodiments thereof. FIG. 2A shows a cross-sectional view of a specimen 20 being probed by an e-beam in accordance with measurement operation 110. To render the description more concrete, it is assumed that specimen 20 includes a plurality of lateral (i.e., horizontal) layers 22 with at least some of layers 22 differing from one another in material composition (e.g., in the concentrations of one or more of the target substances). According to some embodiments, at least some of layers 22 may differ from one another in thickness.

As a non-limiting example, in FIGS. 2A-2D specimen 20 is shown as including three layers disposed one on top of the other: a first layer 22', a second layer 22", and a third layer 22'''. First layer 22' is disposed above second layer 22". Second layer 22" is sandwiched between first layer 22' and third layer 22'''. The top surface of first layer 22' constitutes an external surface 24 of specimen 20. Also shown is an e-beam source 202 and an e-beam 205 produced thereby, so as to impinge (e.g., normally impinge) on external surface 24. E-beam source 202 may be configured to project e-beams (one at a time) at each of a plurality of e-beam landing energies, thereby implementing suboperation 110*a*.

The greater the landing energy of e-beam 205, the greater the depth to which electrons from e-beam 205 will (on average) penetrate into specimen 20. Further, the greater the landing energy of e-beam 205, the greater may be the volume within the specimen wherein electrons from e-beam 205 interact with matter in specimen 20 so as to induce emission of characteristic X-rays. This is exemplified in FIG. 2A via three probed regions 26: A first probed region 26*a* corresponds to the volume in which about all (e.g., at least 80%, at least 90%, or at least 95%) of the characteristic X-ray (i.e. electromagnetic X-ray radiation) emitting inter-actions will occur due to the penetration into specimen 20 of an e-beam at a first e-beam landing energy $E_1$. A second probed region 26b corresponds to the volume in which about all of the characteristic X-ray emitting interactions will occur due to the penetration into specimen 20 of an e-beam at a second e-beam landing energy $E_2$. A third probed region 26c corresponds to the volume in which about all of the characteristic X-ray emitting interactions will occur due to the penetration into specimen 20 of an e-beam at a third e-beam landing energy $E_3$. First probed region 26a is centered about a first point $P_A$ at a depth $u_A$, second probed region 26b is centered about a second point $P_B$ at a depth $u_B$, and third probed region 26c is centered about a third point Pc at a depth $u_C$. $E_1 < E_2 < E_3$. Accordingly, $u_A < u_B < u_C$. According to some embodiments, and as depicted in FIG. 2A, third probed region 26c is of greater size than second probed region 26b, which is of greater size than first probed region 26a.

As elaborated on below in the description of data analysis operation 120, according to some embodiments, the number of e-beam landing energies may be dictated by the required confidence of the classification. According to some embodi-ments, the one or more reference specimens include K≥2 reference specimens, the number of e-beam landing energies may be dictated by $d_{min} = \min\{d_{ij}\}_{i,j \neq i}$, wherein d is the distance between the i-th reference energy signature (per-taining to the i-th reference specimen) and the j-th reference energy signature (pertaining to the j-th reference specimen). According to some embodiments, $d_{ij} = \|\vec{r}_j - \vec{r}_i\|$, wherein for each $1 \leq k \leq K$ $\vec{r}_k$ is the k-th reference energy signature and the double vertical brackets denote a norm, e.g. a $L_2$ norm.

FIG. 2B shows a first e-beam 205a—generated by e-beam source 202 and having the first e-beam landing energy $E_1$—incident on specimen 20. Also delineated is first probed region 26a (in which about all the characteristic X-ray emitting interactions, induced by first e-beam 205a, occur). X-rays may be emitted in all directions, as exemplified by X-rays 215a. X-rays 215a' indicate X-rays (from X-rays 215a), which arrive at an X-ray measurement module 204 (such as the X-ray measurement module of FIG. 6).

Figures 2C, 2D:
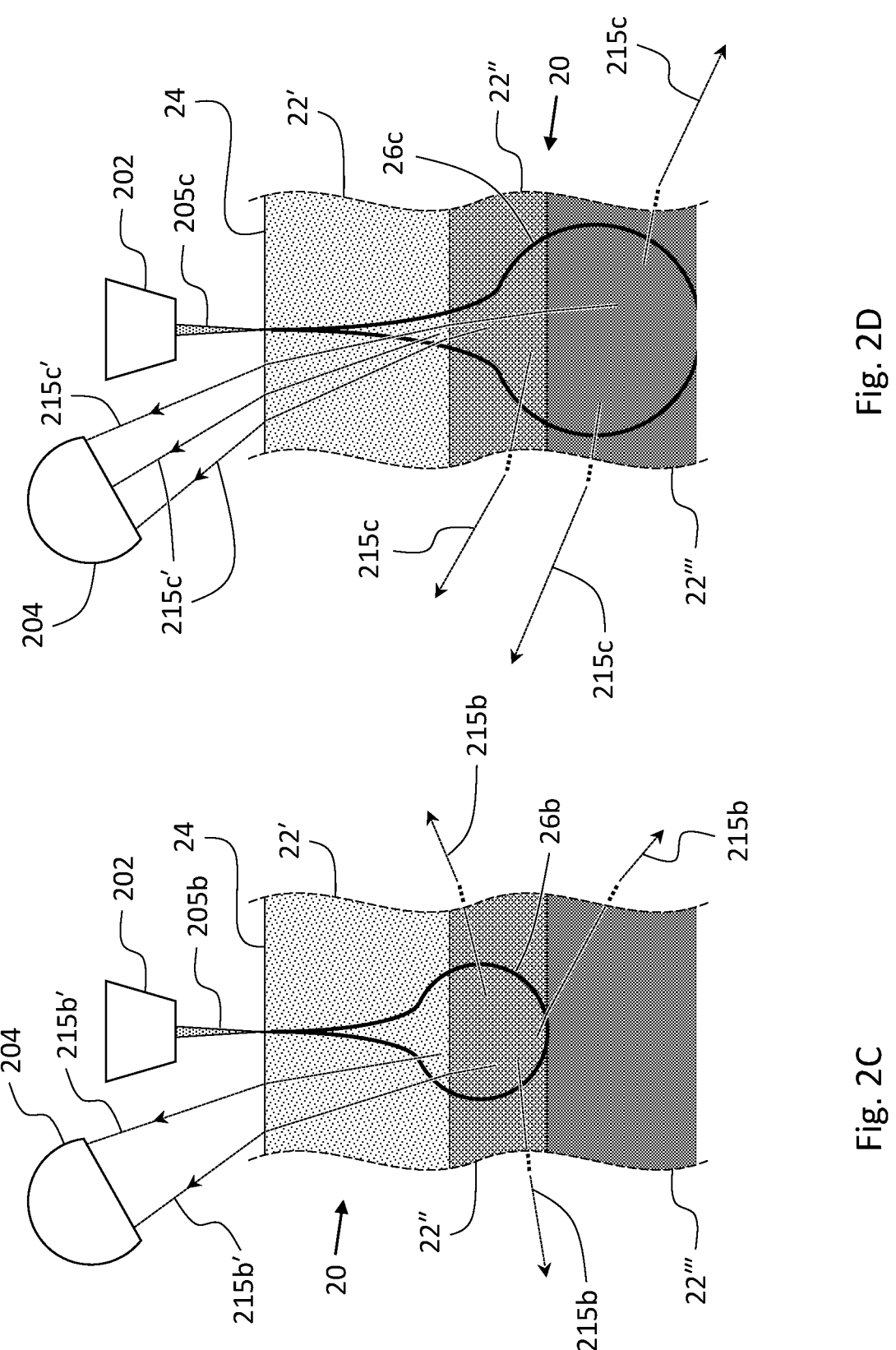

FIG. 2C shows a second e-beam 205b—generated by e-beam source 202 and having the second e-beam landing energy $E_2$—incident on specimen 20. Also delineated is second probed region 26b (in which about all the charac-teristic X-ray emitting interactions, induced by second e-beam 205b, occur). X-rays may be emitted in all direc-tions, as indicated by X-rays 215b. X-rays 215b' indicate X-rays (from X-rays 215b), which arrive at X-ray measure-ment module 204.

FIG. 2D shows a third e-beam 205c—generated by e-beam source 202 and having the third e-beam landing energy $E_3$—incident on specimen 20. Also delineated is third probed region 26c (in which about all the characteristic X-ray emitting interactions, induced by third e-beam 205c, occur). X-rays may be emitted in all directions, as indicated by X-rays 215c. X-rays 215c' indicate X-rays (from emitted X-rays 215c), which arrive at X-ray measurement module 204.

While in FIGS. 2B-2D layers 22 are depicted as differing from one another in their respective refractive indices (as evinced by the refraction of the X-rays on transition from one layer to another), it is to be understood that method 100 is equally applicable without such differences being present.

For each of the e-beam landing energies (e.g. e-beam landing energies $E_1$, $E_2$, and $E_3$), respective measurement data of emitted X-rays may be obtained by X-ray measure-ment module 204, thereby implementing suboperation 110b. The measurement data pertaining to a probed region is indicative of the average concentration of the at least one target substance in the probed region. More specifically, each substance is characterized by a unique set of charac-teristic X-ray lines (i.e. spectral lines in the characteristic X-rays regime) corresponding to the energy differences between orbitals of elements making up the substance. The greater the concentration of a substance, the greater the measured intensity of each characteristic X-ray line pertain-ing thereto.

According to some embodiments, in suboperation 120a, in order to obtain the energy signature, onto each of the X-ray emission spectra (obtained for each of the e-beams of measurement operation 110) a curve is fitted. This is illus-trated by way of example in FIGS. 3A-3E, according to some embodiments, in the case wherein the classification is made based on the energy signature corresponding to a single target substance and taking into account a single characteristic X-ray line thereof. The more general case, wherein the energy signature corresponds to a plurality of target substances and/or for at least some of the target substances a plurality of characteristic X-ray lines thereof is taken into account, is described later on.

Figure 3A:
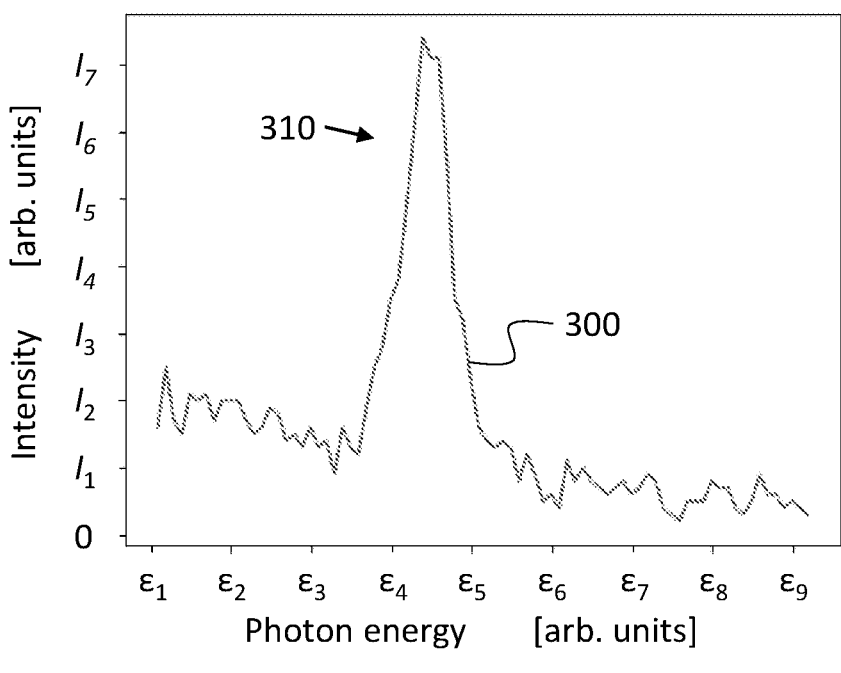
FIG. 3A presents an X-ray emission spectrum of a specimen, which was obtained by implementing a measurement operation of the method of FIG. 1, according to some embodiments thereof.
Figure 3B:
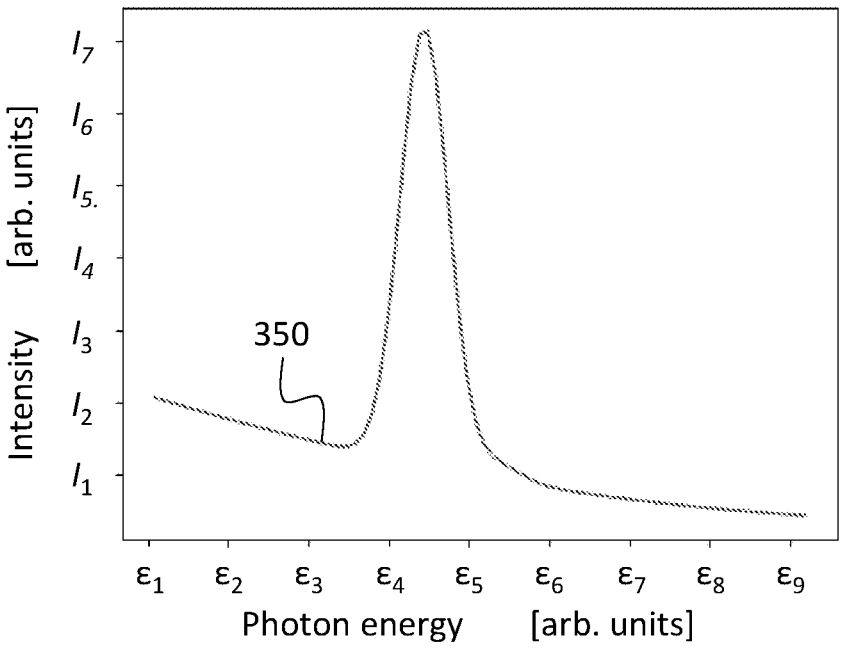
FIG. 3B presents an optimized curve which was fitted onto the X-ray emission spectrum of FIG. 3A, in accordance with specific embodiments of a data analysis operation of the method of FIG. 1.
Figure 3C:
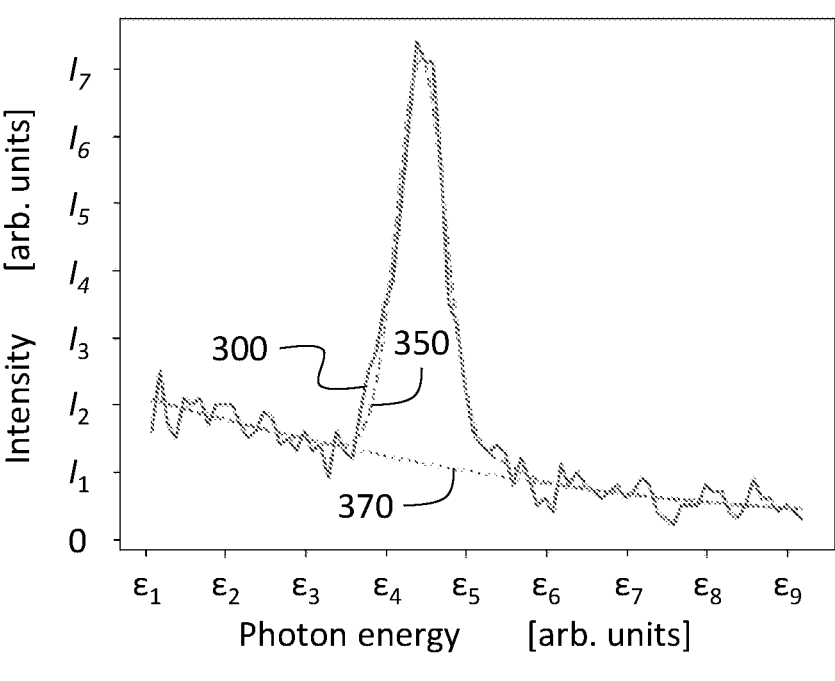
FIG. 3C presents the optimized curve of FIG. 3B superimposed on the X-ray emission spectrum of FIG. 3A.

Referring to FIG. 3A, FIG. 3A depicts a measured (X-ray emission) spectrum 300, which was obtained by implement-ing measurement operation 110 with respect to an inspected specimen (e.g. specimen 20). As in each of FIGS. 3B-3E, the horizontal axis corresponds to the photon energy F (or equivalently the frequency) of the emitted X-rays and the vertical axis to the intensity I of the emitted X-rays. The graduations on each of the horizontal and vertical axes are linearly spaced-apart with $\varepsilon_i < \varepsilon_{i+1}$ and $I_k < I_{k+1}$. A peak 310 of measured spectrum 300 is substantially centered about a characteristic X-ray line of a target substance, which is included in the inspected specimen, and whose energy signature is to be obtained. FIG. 3B depicts an optimized curve 350, which was fitted onto measured spectrum 300. FIG. 3C depicts optimized curve 350 superimposed on measured spectrum 300.

According to some embodiments, the fitting onto mea-sured spectrum 300 involves optimizing over values of one or more adjustable parameters of a curve (also referred to as the "free curve"), thereby obtaining optimized curve 350. The values of the one or more adjustable parameters are fixed by minimizing (over the one or more adjustable parameters) a distance between the free curve and the measured spectrum.

The one or more adjustable parameters may include a (first) adjustable parameter whose value is indicative of an intensity of the emitted X-rays about the characteristic X-ray line of the target substance. According to some such embodi-ments, the adjustable parameter is a multiplicative coeffi-cient of a normalized cap-shaped function (e.g., a normal-ized gaussian), which may be centered the characteristic X-ray line. According to some embodiments, the one or more adjustable parameters include a plurality of adjustable parameters. The plurality of adjustable parameters includes—in addition to the first adjustable parameter—an additive bias parameter, at least one parameter governing a shape of the cap-shaped function (e.g., the width of a normalized gaussian), and/or a (characteristic X-ray) line shift parameter governing the location of the center of the cap-shaped function.

More generally, according to some embodiments, the free curve may be a sum of at least two adjustable functions: an adjustable cap-shaped function, which may be centered about the characteristic X-ray line, and an adjustable second function quantifying the (continuous) spectrum of the bremsstrahlung (i.e. background radiation) component of the respective measured X-ray emission spectrum (e.g. the background radiation in the vicinity of the characteristic X-ray line). As a non-limiting example, the at least one landing energy includes N e-beam landing energies $$\{E_n\}_{n=1}^N,$$

so that N X-ray emission spectra are measured:

$$\{f_n(\varepsilon)\}_{n=1}^N.$$

Here $\varepsilon$ denotes a photon energy of the emitted X-rays and $f_n(\varepsilon)$ is the measured X-ray emission spectrum (in a photon energy range including the characteristic X-ray line of the target substance) induced by projecting an e-beam at the landing energy $E_n$. Onto the set of measured spectra $$\{f_n(\varepsilon)\}_{n=1}^N$$

a set of free curves $$\{c_n(\varepsilon)\}_{n=1}^N$$

is fitted. According to some embodiments, for each $1 \leq n \leq N$, $c_n(\varepsilon) = G_n(\varepsilon) + p_n(\varepsilon)$, wherein $G_n(\varepsilon)$ is the adjustable cap-shaped function and $p_n(\varepsilon)$ is the adjustable second function. $G_n(\varepsilon) = a_n \cdot g_n(\varepsilon)$, wherein $g_n(\varepsilon)$ is a normalized cap-shaped function and an is a multiplicative coefficient. According to some embodiments, $g_n(\varepsilon)$ may be a (normalized) gaussian, in which case the width and, optionally, center of $g_n(\varepsilon)$ may be adjustable parameters (over which the optimization is carried out). According to some alternative embodiments, $g_n(\varepsilon)$ may be a (normalized) gamma distribution or generalized gaussian distribution. According to some embodiments, $p_n(\varepsilon)$ may be a polynomial (e.g., a first order polynomial or a second order polynomial) whose coefficients are adjustable. Alternatively, according to some embodiments, $p_n(\varepsilon)$ may be determined from Kramer's law.

Since $g_n(\varepsilon)$ is normalized, an substantially equals the intensity of the X-rays (or equivalently the number of photons) emitted due to transitions, which correspond to the characteristic X-ray line of the target substance, and collected (detected) by the X-ray measurement module.

Denoting by $\{g_n, i\}_i$ and $\{p_n, i\}_i$ the adjustable parameters of $g_n(\varepsilon)$ and $p_n(\varepsilon)$, respectively, for each $1 \leq n \leq N$ the optimized values $\hat{a}_n$, $\{\hat{g}_n, i\}_i$, and $\{\hat{p}_n, i\}_i$ of the adjustable parameters may be obtained by minimizing $D(c_n(\varepsilon), f_n(\varepsilon))$ over $a_n$, $\{g_n, i\}_i$ and $\{p_n, i\}_i$. $D(c_n(\varepsilon), f_n(\varepsilon))$ is a distance between $c_n(\varepsilon)$ and $f_n(\varepsilon)$. As a non-limiting example, according to some embodiments, wherein $g_n(\varepsilon)$ is gaussian and $p_n(\varepsilon)$ is a second order polynomial: (i) $\{g_n, i\}_i = \{g_{n, 1}, g_{n, 2}\}$ with $g_{n, 1}$ and $g_{n, 2}$ parameterizing the width and center of the gaussian; and (ii) $\{p_n, i\}_i = \{p_{n, 0}, p_{n, 1}, p_{n, 2}\}$ with $p_{n, 0}$, $p_{n, 1}$, and $p_{n, 2}$ being the zeroth order, first order, and second order coefficients of the polynomial. In particular, $\hat{a}_n = \mathrm{argmin}_{a_n} \min_{\{g_n, i\}_i} D(c_n(\varepsilon), f_n(\varepsilon))$. According to some embodiments, $D(c_n(\varepsilon), f_n(\varepsilon)) = \int d\varepsilon |c_n(\varepsilon) - f_n(\varepsilon)|^2$ (or a discretized equivalent expression). According to some embodiments, a regularization term may be added to $D(c_n(\varepsilon), f_n(\varepsilon))$ to take into account prior knowledge regarding any of the free parameters and/or stabilize the solution (of the minimization algorithm).

According to some alternative embodiments, wherein there exists prior knowledge relating at least some of the free parameters to one another, the full set of optimized values, i.e., $$\{\hat{a}_n, \{\hat{g}_{n,i}\}_i, \{\hat{p}_{n,i}\}_i\}_{n=1}^N$$

(or equivalently $$\{\hat{a}_n, \hat{g}_n(\varepsilon), \hat{p}_n(\varepsilon)\}_{n=1}^N,$$

wherein $\hat{g}_n(\varepsilon)$ and $\hat{p}_n(\varepsilon)$ denote the optimized functions defined by $\{\hat{g}_{n, i}\}_i$ and $\{\hat{p}_{n, i}\}_i$, respectively) is obtained by jointly optimizing over all of the adjustable parameters, i.e.

$$\{a_n, \{g_{n,i}\}_i, \{p_{n,i}\}_i\}_{n=1}^N$$

subject to constraints imposed by the aforementioned prior knowledge. More specifically, in such embodiments, $$\{\hat{a}_n\}_{n=1}^N = \mathrm{argmin}_{\{a_n\}_{n=1}^N} \min\{\{g_{n,i}\}_i, \{p_{n,i}\}_i\}_{n=1}^N \sum_{n=1}^N D(c_n(\varepsilon), f_n(\varepsilon))$$

$$\mathrm{s.t.} \quad \{Q_k\}_k,$$

wherein $\{Q_k\}_k$ is the set of constraints (i.e. each of the $Q_k$ is an equation, or inequality, relating at least some of the free parameters to one another).

Figure 3D:
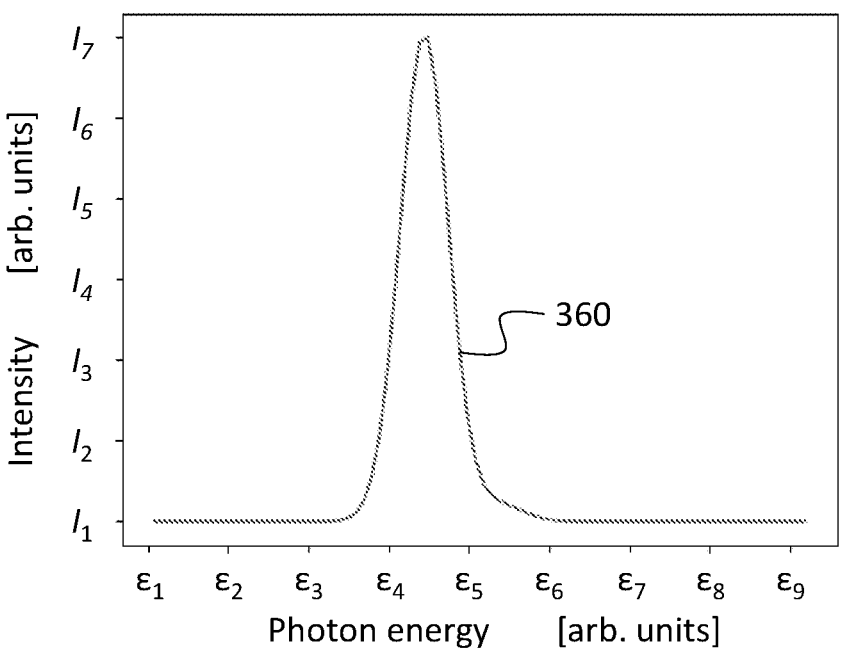
FIG. 3D presents a fitted gaussian included in the optimized curve of FIG. 3B, according to some embodiments.
Figure 3E:
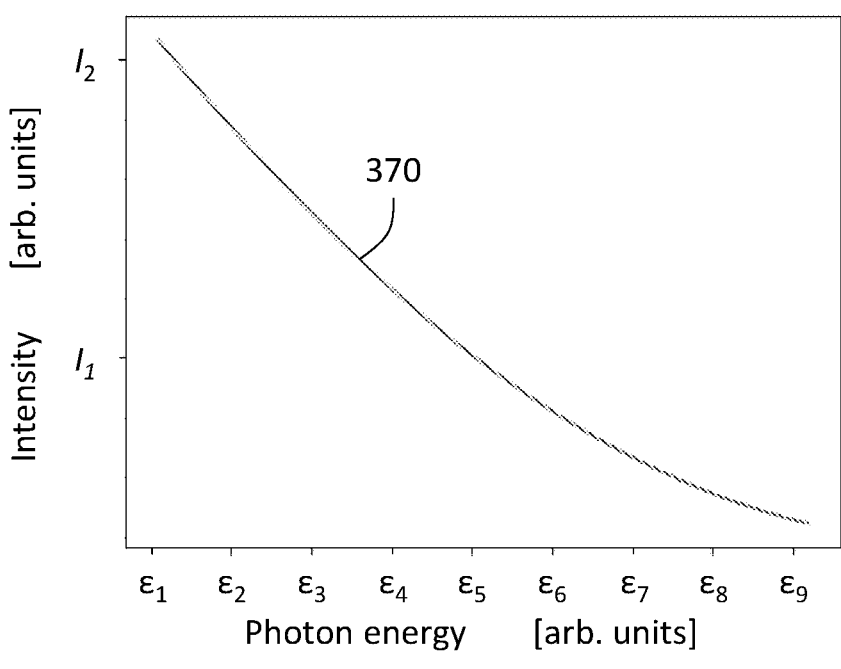
FIG. 3E presents a fitted polynomial included in the optimized curve of FIG. 3B, the fitted polynomial accounting for bremsstrahlung, according to some embodiments.

As a non-limiting example, according to some embodiments, depicted in FIGS. 3B-3E, the free curve is a sum of three adjustable functions. In addition to $g_n(\varepsilon)$, which is gaussian, and $p_n(\varepsilon)$, which is a second order polynomial, the sum additionally includes a gaussian $Y_n(\varepsilon)$. Referring to FIG. 3D, a curved line 360 corresponds to $\hat{a}_n \cdot \hat{g}_n(\varepsilon) + \hat{Y}_n(\varepsilon)$. $\hat{Y}_n(\varepsilon)$ (which is also gaussian) was obtained by optimizing over free parameters of $Y_n(\varepsilon)$. $\hat{g}_n(\varepsilon)$ is centered about the characteristic X-ray line of the target substance. $\hat{Y}_n(\varepsilon)$ is centered about a characteristic X-ray line of a (non-target) second substance present in the inspected specimen. The characteristic line of the second substance is close to the characteristic line of the target substance and accordingly was taken into account in order to improve the accuracy of the classification. Referring to FIG. 3E, a curved line 370 corresponds to $\hat{p}(\varepsilon)$. Curved line 370 is also plotted in FIG. 3C.

According to some embodiments, wherein the X-ray emission spectrum about a single characteristic X-ray line of a single target substance (included in the inspected specimen) is used to determine the energy signature, the energy signature is an N component vector $\vec{s} = (s_1, s_2, \ldots, s_N)$. (That is, the number of components of $\vec{s}$ is equal to the number of e-beam landing energies.) According to some embodiments, for each $1 \le n \le N$, the n-th component of the energy signature (i.e. $s_n$) is equal to $\hat{a}_n$. More generally, according to some embodiments, $\vec{s} = (s(\hat{a}_1, \{\hat{p}_{1,i}\}_i), s(\hat{a}_2, \{\hat{p}_{2,i}\}_i, \ldots, s(\hat{a}_N, \{\hat{p}_{N,i}\}_i))$ wherein for each $1 \le n \le N$ $s(\hat{a}_n, \{\hat{p}_{n,i}\}_i)$ is a function of $\hat{a}_n$ and $\{\hat{p}_{n,i}\}$i. That is, for each $1 \le n \le N$ the n-th component of the energy signature is a function of both an and the coefficients of $\hat{p}_n(\varepsilon)$. According to some such embodiments, for each $1 \le n \le N$ s $(\hat{a}_n, \{\hat{p}_{n,i}\}_i) = s(\hat{a}_n, q(\{\hat{p}_{n,i}\}_i))$, wherein q is a function of the coefficients of $\hat{p}_n(\varepsilon)$. As a non-limiting example, according to some embodiments, q $(\{\hat{p}_{n,i}\}_i) = \langle \hat{p}_n(\varepsilon) \rangle$ and s $(\hat{a}_n, q(\{\hat{p}_{n,i}\}_i)) = \hat{a}_n / \langle \hat{p}_n(\varepsilon) \rangle$, wherein the triangular brackets denote averaging about the center of $\hat{g}_n(\varepsilon)$ along an interval equal to the width of $\hat{g}_n(\varepsilon)$.

According to some embodiments, and as elaborated on below, data analysis operation 120 further includes computing a confidence of the classification of the inspected specimen.

In suboperation 120b one or more distances (e.g. norms) between the energy signature—computed in suboperation 120a based on the measurement data obtained in measurement operation 110—and the one or more reference energy signatures, respectively, may be computed. According to some embodiments, wherein the one or more reference specimens include a single reference specimen (i.e. $K=1$), the inspected specimen may be classified as being in the same class as the reference specimen when $d \le \delta$. Here d is the distance between the measured energy signature s and the reference energy signature $\vec{r}$ (pertaining to the reference specimen) and $\delta$ is a (positive) threshold value. $\delta$ may be determined based on the required confidence of the classification. According to some embodiments, $d = \| \vec{s} - \vec{r} \|$.

According to some embodiments, wherein the one or more reference specimens include $K \ge 2$ reference specimens, the inspected specimen may be classified as being in a k-th class, corresponding to the k-th reference specimen, when $d_k = \min\{d_i\}_i$. $d_i$ is the distance between the measured energy signature and the i-th reference energy signature (pertaining to the i-th reference specimen), e.g. $d_i = \| \vec{s} - \vec{r}_i \|$, wherein $\vec{r}_i$ is the i-th reference energy signature.

According to some embodiments, wherein method 100 is used to classify the inspected specimen to one of $K+1 \ge 3$ classes and the one or more reference specimens include $K \ge 2$ reference specimens, when $\min\{d_i\}_i > \delta$, the inspected specimen is classified as not being in the same class as any of the K reference specimens. When $d_k = \min\{d_i\}_i \le \delta$, the inspected specimen is classified as being in the k-th class (pertaining to the k-th reference specimen).

According to some embodiments, wherein data analysis operation 120 further includes computing the confidence, the confidence may be computed based at least on the noise variance (e.g., as estimated from the measurement data) and the optimized values of the adjustable parameters. According to some embodiments, the computing of the confidence may involve computing variances $$\{\sigma_{s_n}^2\}_{n=1}^N,$$

wherein $$\sigma_{s_n}^2$$

is the variance of $s_n$ (the n-th component of the energy signature). According to some embodiments, $$\sigma_{s_n}^2$$

is proportional to the noise variance and further depends on the optimized values of the adjustable parameters of the n-th free curve. The noise variance may be estimated from spectral segments of the measured X-ray emission spectra. According to some embodiments, a photon energy interval delimiting the spectral segments may be selected to be devoid of any significant peaks and significant dips. That is, no characteristic X-ray line of the target substance, or any other substance that is non-negligibly present in the inspected specimen, are included in the photon energy interval. According to some such embodiments, the photon energy interval is selected to be near the characteristic X-ray line of the target substance.

Figure 4:
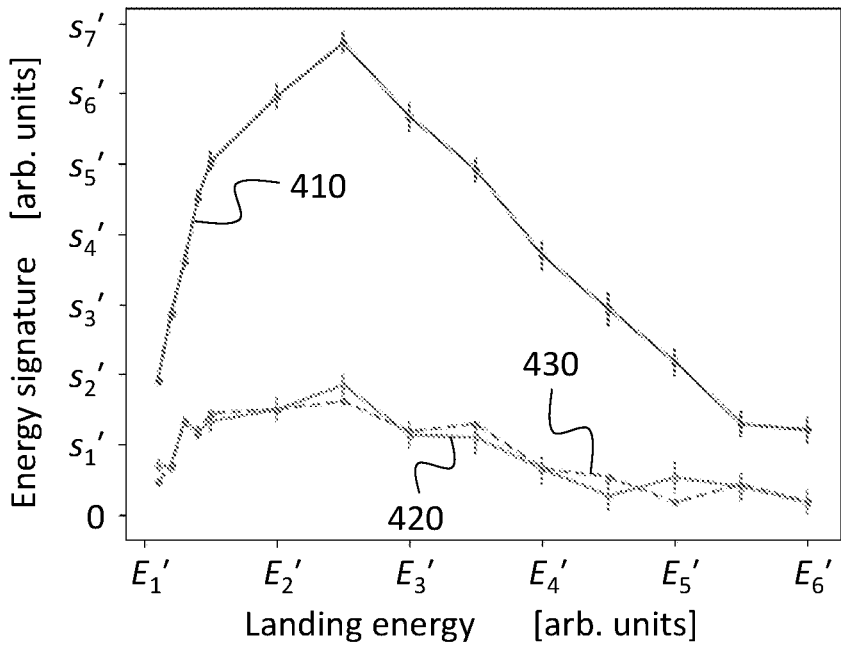
FIG. 4 presents three plots corresponding to an energy signature, obtained in accordance with specific embodiments of the method of FIG. 1, a first reference energy signature, and a second reference energy signature, respectively.

FIG. 4 presents three plots: A first plot 410 corresponds to a first reference energy signature pertaining to a first class. A second plot 420 corresponds to a second reference energy signature pertaining to a second class. A third plot 430 corresponds to a measured energy signature pertaining to an inspected specimen, obtained in accordance with some specific embodiments of method 100. The horizontal axis corresponds to the landing energy E' of the e-beams and the vertical axis to the energy signature s'. The graduations on each of the horizontal and vertical axes are linearly spaced-apart with $$E_i' < E_{i+1}' \text{ and } s_k' < s_{k+1}'.$$

Third plot 430 is significantly closer to second plot 420 than to first plot 410. Thus, according to some embodiments of method 100, wherein the number of classes is two (i.e., the number of classes is equal to the number of reference specimens), the inspected specimen is classified as being in the second class. According to some embodiments of method 100, wherein the number of classes is three (i.e., the number of classes is equal to the number of reference specimens plus one class signifying that the inspected specimen is not in the first class and not in the second class), the inspected specimen may be classified as being in the second class.

According to some embodiments, the energy signature may be derived based on a dependence on the e-beam landing energy of the intensities of the emitted X-rays about each of a plurality of different characteristic X-ray lines. According to some such embodiments, wherein M is the number of different characteristic X-ray lines, the energy signature is an M×N component vector with components $s_{ij}$. The first index denotes the e-beam landing energy and the second index denotes the characteristic X-ray line. That is, $\vec{s} = (s_{11}, s_{12}, \ldots, s_{1M}, s_{21}, s_{22}, \ldots s_{2M}, \ldots s_{N1}, s_{N2}, \ldots, s_{NM})$. In such embodiments, in measurement operation 110, for each e-beam landing energy, the X-ray emission spectrum is measured over a photon energy range or photon energy ranges including the plurality of characteristic X-ray lines. The components of $\vec{s}$ pertaining to a same characteristic X-ray line (e.g. $s_{21}, s_{22}, \ldots, s_{2N}$) may be obtained as described above in the case wherein M=1. According to some embodiments, wherein the at least one target substance includes B (B≤M) target substances, the M characteristic X-ray lines include characteristic X-ray lines corresponding to each of the B target substances, respectively.

According to some embodiments, method 100 may be employed to classify specimens according to a distribution of a material, which was introduced (i.e. inserted) into a bulk of the inspected specimen in an earlier stage in the fabrication process of the inspected specimen. In such embodiments, the at least one substance of operation 120a may be constituted by the introduced material. That is, in suboperation 120a the measurement data (obtained in measurement operation 110) is processed to obtain an energy signature of the introduced material. In particular, method 100 may be employed to classify a specimen to one of K or K+1 classes, wherein K is the number of reference specimens, and wherein the reference specimens are characterized by a bulk of the same design intent as the bulk of the inspected specimen and substantially differ from one another only in the distribution of the introduced material.

The introduced material may be inserted into the bulk (e.g., a patterned wafer or a semiconductor structure) in order to moderately modify one or more physical properties of the bulk (e.g., to increase electrical conductivity and/or capacitance). According to some embodiments, the bulk may be or include a plurality of thin layers stacked one on top of the other. Each of the layers may be composed of a respective bulk material(s) (e.g., a respective semiconductor material(s)). According to some such embodiments, the introduced material may include fluorine, nitrogen, boron, and/or gallium. As used herein, according to some embodiments, the term "design intent", when employed in relation to a specimen including a bulk into which a material has been introduced after fabrication of the bulk, refers at least to the design intent of the bulk. According to some such embodiments, the design intent may additionally specify the nominal (i.e., intended) distribution of the introduced material within the bulk.

According to some embodiments, the concentration of the introduced material in an inspected specimen may be too low to allow classifying the inspected specimen based solely (i.e., only) on the measured X-ray emission spectra of the inspected specimen. According to some such embodiments, in suboperation 120a—in order to identify the contribution of the introduced material to the measured X-ray emission spectra (obtained for each of the e-beams of measurement operation 110)—from each of the X-ray emission spectra a respective control spectrum is subtracted, thereby obtaining a respective spectral difference. Onto each of the spectral differences a respective free curve is then fitted to obtain a respective optimized curve from which the energy signature of the introduced material is then derived in an essentially similar manner to that described above (i.e. when control spectra are not utilized) and as elaborated on below. The control spectrum may be obtained by implementing measurement operation 110 with respect to a bulk of a same design intent as the bulk of the inspected specimen. The one or more reference energy signatures are obtained from reference spectral differences, in essentially the same manner to that described above (i.e. when control spectra are not employed). The reference spectral differences are obtained by subtracting the control spectra from the X-ray emission spectra corresponding to each of the one or more reference specimens.

According to some embodiments, a concentration of a second material, which is included in the inspected specimen, may be lower in the inspected specimen than in the untreated bulk (that is, the bulk prior to the insertion of the introduced material). The lower concentration of the second material (also referred to as "depleted material") may manifest as one or more dips in the spectral differences, which are centered about one or more characteristic X-ray lines, respectively, of the depleted material. According to some embodiments, the depletion in the second material may be correlated to the concentration of the introduced material. According to some such embodiments, this correlation may be introduced as a constraint in the fitting of the free curves.

According to some embodiments, the classification of an inspected specimen, which includes an introduced material, may potentially be improved by additionally taking into account of the reduction in the concentration of the depleted material. As already mentioned, the reduction may be exhibited in the spectral differences as dips about a characteristic X-ray line of the depleted material. Accordingly, the energy signature may include 2N components: two per e-beam landing energy. According to some such embodiments, and as depicted in FIGS. 5D and 5E, the photon energy range, over which each spectral difference is fitted onto a respective free curve, may include the characteristic X-ray line of the depleted material. The set of adjustable parameters of the free curve may include adjustable parameters accounting both for the sizes, shapes, and positions of peaks and dips in the spectral differences about a first characteristic X-ray line and a second characteristic X-ray line, respectively. The first characteristic X-ray line pertains to the introduced material. The second characteristic X-ray line pertains to the depleted material.

More generally, according to some embodiments, the free curve may be a sum of at least two adjustable functions: an adjustable cap-shaped function centered about the first characteristic X-ray line and an adjustable additional (bulge-shaped) function centered about the second characteristic X-ray line. (About the first characteristic X-ray line each of the spectral differences exhibits a peak, while about the second characteristic X-ray line each of the spectral differences exhibits a dip.) Accordingly, the adjustable additional function may be cup-shaped. As a non-limiting example, the plurality of landing energies may include N e-beam landing energies $$\{E_n\}_{n=1}^N,$$

so that N spectral differences are measured:

$$\{\tilde{f}_n(\varepsilon)\}_{n=1}^N.$$

A set of free curves $$\{\tilde{c}_n(\varepsilon)\}_{n=1}^N$$

is fitted onto the spectral differences $$\{\tilde{f}_n(\varepsilon)\}_{n=1}^N.$$

For each $1 \leq n \leq N$, $\tilde{c}_n(\varepsilon) = \tilde{G}_n(\varepsilon) + H_n(\varepsilon)$, wherein $\tilde{G}_n(\varepsilon)$ and $H_n(\varepsilon)$ are the (adjustable) cap-shaped function and the cup-shaped function, respectively. $\tilde{G}_n(\varepsilon) = \tilde{a}_n \cdot \tilde{g}_n(\varepsilon)$, wherein $\tilde{g}_n(\varepsilon)$ is a normalized cap-shaped function and $\tilde{a}_n$ is a positive multiplicative coefficient. $H_n(\varepsilon) = b_n \cdot h_n(\varepsilon)$, wherein $h_n(\varepsilon)$ is a normalized cap-shaped function and $b_n$ is a negative multiplicative coefficient. According to some embodiments, $\tilde{G}_n(\varepsilon)$ may be a gaussian and $H_n(\varepsilon)$ may be an inverted gaussian (so that each of $\tilde{g}_n(\varepsilon)$ is and $h_n(\varepsilon)$ is a normalized gaussian). The widths and, optionally, locations of the centers of $\tilde{g}_n(\varepsilon)$ and $h_n(\varepsilon)$ may be adjustable parameters. According to some alternative embodiments, $\tilde{g}_n(\varepsilon)$ and/or $h_n(\varepsilon)$ may be a (normalized) gamma distribution or generalized gaussian distribution.

According to some embodiments, suboperation 120 may further include estimating the spectrum of the bremsstrahlung by fitting onto each of the control spectra a function (also referred to as "the second function") in a photon energy range including the characteristic X-ray lines of the introduced material and the depleted material. Denoting by $$\{\tilde{p}_n(\varepsilon)\}_{n=1}^N$$

the set of adjustable functions, according to some embodiments, the $\tilde{p}_n(\varepsilon)$ may be a polynomial (e.g., a first order polynomial or second order polynomial) whose coefficients are adjustable.

From the fitted (i.e., optimized) $\tilde{g}_n(\varepsilon)$, $h_n(\varepsilon)$, and $\tilde{p}_n(\varepsilon)$, respectively—the energy signature of the introduced material may then derived in an essentially similar manner to that described above with respect to embodiments wherein control spectra are not utilized. Accordingly, as a non-limiting example, the energy signature $\vec{s}$ may be a 2N component vector. According to some embodiments, for each $1 \leq n \leq N$, the (2n−1)-th and 2n-th components of the energy signature are equal to $$\tilde{a}'_n \text{ and } b'_n,$$

respectively, wherein $$\tilde{a}'_n \text{ and } b'_n$$

are the optimized values of $\tilde{a}_n$ and $b_n$, respectively. More generally, according to some embodiments, $$\vec{s} = \left( s_A\!\left(\tilde{a}'_1, \{\tilde{p}'_{1,i}\}_i\right), s_B\!\left(b'_1, \{\tilde{p}'_{1,i}\}_i\right), s_A\!\left(\tilde{a}'_2, \{\tilde{p}'_{2,i}\}_i\right), s_B\!\left(b'_2, \{\tilde{p}'_{2,i}\}_i\right), \right.$$
$$\left. \ldots, s_A\!\left(\tilde{a}'_N, \{\tilde{p}'_{N,i}\}_i\right), s_B\!\left(b'_N, \{\tilde{p}'_{N,i}\}_i\right) \right)$$

wherein for each $1 \leq n \leq N$, the (2n−1)-th component of the energy signature—i.e., $$s_A\!\left(\tilde{a}'_n, \{\tilde{p}'_n, i\}_i\right)$$

—is a function of $$\tilde{a}'_n \text{ and } \{\tilde{p}'_n, i\}_i,$$

and the 2n-th component of the energy signature—i.e.

$$s_B\!\left(b'_n, \{\tilde{p}'_{n,i}\}_i\right)$$

—is a function of $$b'_n \text{ and } \{\tilde{p}'_{n,i}\}_i.$$

Here the $$\{\tilde{p}'_{n,i}\}_i$$

denote the optimized values of the $\{\tilde{p}_{n,i}\}_i$, respectively. The $\{\tilde{p}_{n,i}\}_i$ are the parameters of the $\tilde{p}_n(\varepsilon)$, respectively. According to some embodiments, $s_A$ and $s_B$ may differ in in form.

According to some embodiments, for each $$1 \leq n \leq N: \; (i) s\!\left(\tilde{a}'_n, \{\tilde{p}'_{n,i}\}_i\right) = s\!\left(\tilde{a}'_n, q_A\!\left(\{\tilde{p}'_{n,i}\}_i\right)\right),$$

wherein $$s\!\left(\tilde{a}'_n, \{\tilde{p}'_{n,i}\}_i\right)$$

is the (2n−1)-th component of the energy signature and $q_A$ is a function of the $$\{\tilde{p}'_{n,i}\}_i, \text{ and } (ii) \; s\!\left(\tilde{b}'_n, \{\tilde{p}'_{n,i}\}_i\right) = s\!\left(\tilde{b}'_n, q_B\!\left(\{\tilde{p}'_{n,i}\}_i\right)\right),$$

wherein $$s\!\left(\tilde{b}'_n, \{\tilde{p}'_{n,i}\}_i\right)$$

is the 2n-th component of the energy signature and herein $q_B$ is a function of the $$\{\tilde{p}'_{n,i}\}_i.$$

According to some embodiments, $q_A$ and $q_B$ have the same form. As a non-limiting example, according to some embodiments, $$q_A(\{\tilde{p}'_{n,i}\}_i) = \langle \tilde{p}'_n(\varepsilon) \rangle_{w_A} \text{ and } s_A(\tilde{a}'_n, q_A(\{\tilde{p}'_{n,i}\}_i)) = \tilde{a}'_n / \langle \tilde{p}'_n(\varepsilon) \rangle_{w_A}, \qquad \text{(i)}$$

wherein $w_A$ denotes the photon energy interval below $$\tilde{g}'_n(\varepsilon)$$

(and additionally indicates that the averaging is over the photon energy interval), and $$q_B(\{\tilde{p}'_{n,i}\}_i) = \langle \tilde{p}'_n(\varepsilon) \rangle_{w_B} \text{ and } s_B(b'_n, q_B(\{\tilde{p}'_{n,i}\}_i)) = b'_n / \langle \tilde{p}'_n(\varepsilon) \rangle_{w_B}, \qquad \text{(ii)}$$

wherein $w_B$ denotes the photon energy interval below $$h'_n(\varepsilon).$$

Since $\tilde{g}_n(\varepsilon)$ is normalized, $$\tilde{a}'_n$$

substantially equals the increase, as compared to the untreated bulk, in the intensity of the X-rays (or equivalently the number of photons) (i) emitted due to characteristic X-ray transitions, which correspond to the first characteristic X-ray line (i.e., the characteristic X-ray line of the introduced material), and (ii) collected by the X-ray measurement module. Similarly, since $h_n(\varepsilon)$ is normalized, $b_n'$ substantially equals the decrease, as compared to the untreated bulk, in the intensity of the X-rays (or equivalently decrease the number of photons) (i') emitted due to characteristic X-ray transitions, which correspond to the second characteristic X-ray line (i.e. the characteristic X-ray line of the depleted material), and (ii') collected by the X-ray measurement module.

According to some embodiments, the control spectra may be obtained by implementing measurement operation 110 with respect to one or more bulks of a same design intent as the bulk of the inspected specimen (and which have not had the (introduced) material inserted thereinto). According to some embodiments, the control spectra may be obtained by implementing measurement operation 110 with respect to the bulk of the inspected specimen (i.e. prior to the introduction of the (introduced) material into the bulk).

Figure 5A:
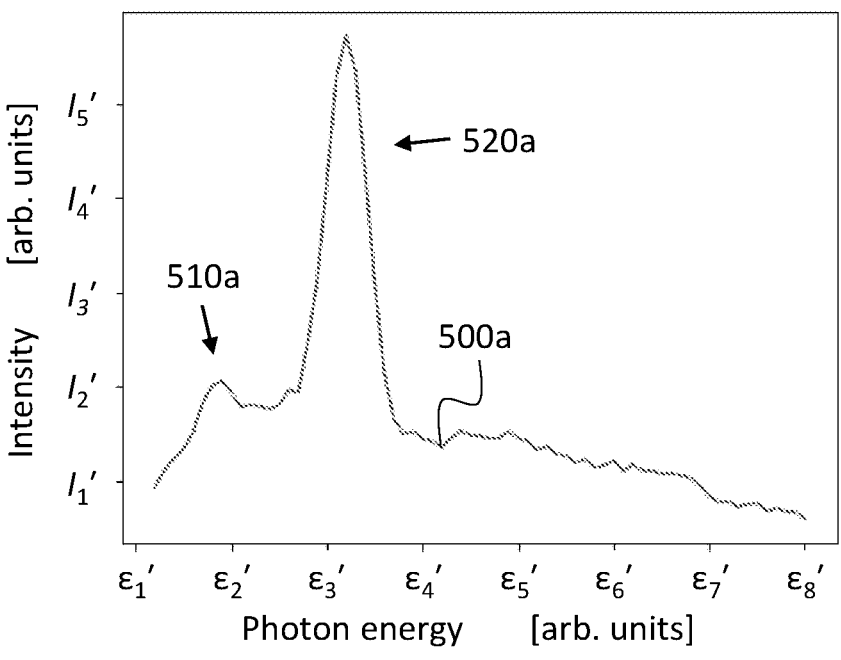
FIG. 5A presents a measured X-ray emission spectrum of a specimen including a bulk into which a material has been introduced.
Figure 5B:
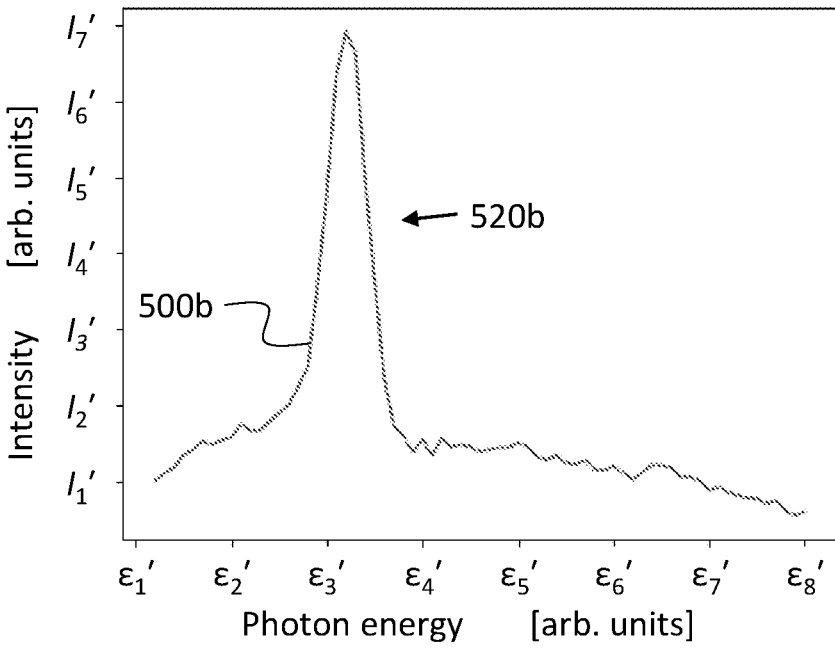
FIG. 5B presents a measured X-ray emission spectrum of the bulk of the specimen of FIG. 5A.
Figure 5C:
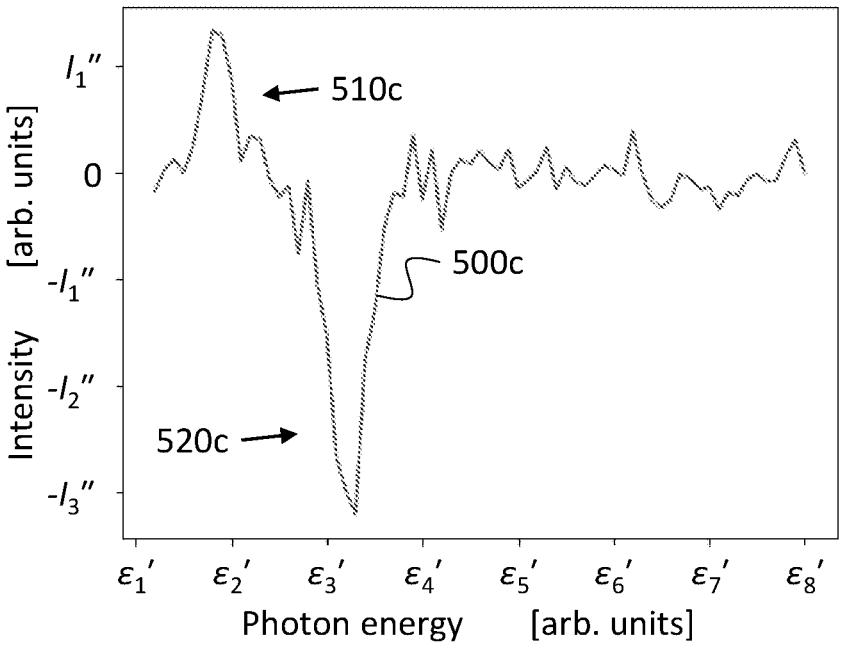
FIG. 5C presents a spectral difference plot obtained by subtracting the X-ray emission spectrum of the specimen from the X-ray emission spectrum of the bulk, in accordance with some specific embodiments of the method of FIG. 1 wherein the energy signature is of the introduced material.
Figure 5D:
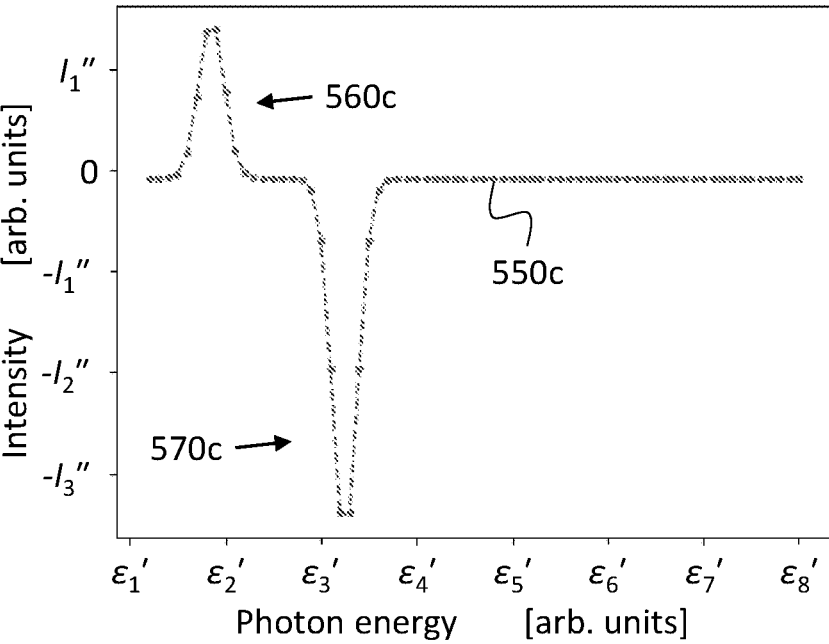
FIG. 5D presents an optimized curve which was fitted onto the spectral difference plot of FIG. 5C, in accordance with some specific embodiments of the method of FIG. 1.
Figure 5E:
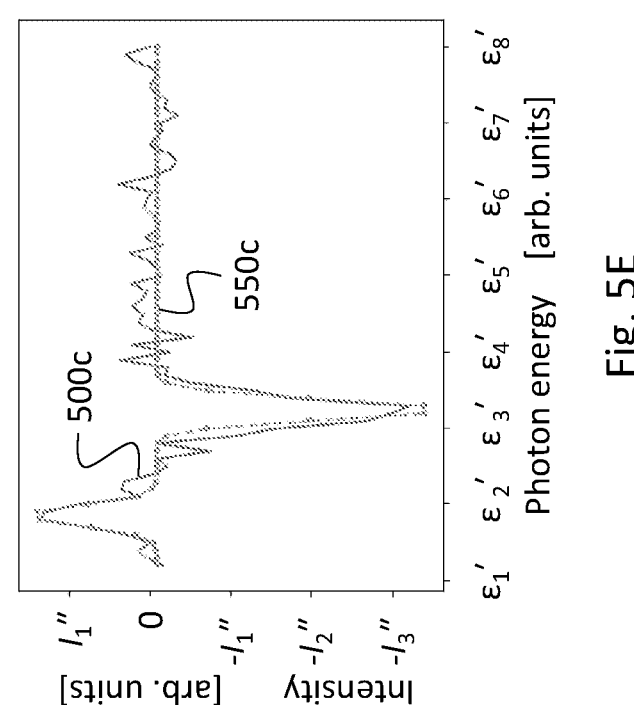
FIG. 5E presents the optimized curve of FIG. 5D superimposed on the spectral difference plot of FIG. 5C.

To facilitate the description, reference is additionally made to FIGS. 5A-5E: FIG. 5A presents a measured X-ray emission spectrum 500a of an inspected specimen including a bulk into which an (introduced) material has been inserted, e.g. as described above. The X-ray emission spectrum of the inspected specimen was obtained by irradiating the inspected specimen with an e-beam having a landing energy E", e.g. as described above. As in each of FIGS. 5B-5E, the horizontal axis corresponds to the photon energy (or equivalently the frequency) of the emitted X-rays and the vertical axis to the intensity of the emitted X-rays. The graduations on each of the horizontal and vertical axes are linearly spaced-apart with $$\varepsilon'_i < \varepsilon'_{i+1} \text{ and } I'_k < I'_{k+1} \text{ (and } I''_k < I''_{k+1}\text{)}$$

in FIGS. 5C-5E). FIG. 5B presents a measured control spectrum 500b of the inspected specimen. The X-ray emission spectrum was obtained by irradiating a bulk of a same design intent as the bulk of the inspected specimen with an e-beam having the landing energy E", e.g., as described above. FIG. 5C presents a plot 500c corresponding to the spectral difference between the X-ray emission spectrum of FIG. 5A and the X-ray emission spectrum of FIG. 5B. FIG. 5D presents an optimized curve 550c which was fitted onto plot 500c, in accordance with some specific embodiments of method 100. FIG. 5E presents optimized curve 550c superimposed on plot 500c.

Referring to FIG. 5C, plot 500c includes a peak 510c centered about a characteristic X-ray line (not indicated) of the introduced material. A peak 510a in FIG. 5A is substantially centered about the same characteristic X-ray line as peak 510c. However, since the height of peak 510a is comparable to the level of noise present, classification, or at least high-precision classification, based solely on the X-ray emission spectra of the inspected specimen (i.e. without taking into account the control spectra) is not viable. Plot 500c further includes a dip 520c centered about a second characteristic X-ray line (not indicated) of a depleted material, which was present in the bulk at a greater concentration prior to the insertion of the introduced material. Unlike peak 510c, peaks 520a and 520b, centered about the second characteristic X-ray line (i.e., pertaining to dip 520c), are highly conspicuous in FIGS. 5A and 5B, respectively. The intensity of peak 520a is lower than that of peak 520b— reflecting the lower concentration of the second material in the inspected specimen as compared to the untreated bulk. Referring to FIG. 5C, optimized curve 550c includes a first curve 560c and a second curve 570c resulting from the fitting of a sum including a cap-shaped function (accounting for peak 510c) and a cup-shaped function (accounting for dip 520c).

The skilled person will readily perceive that the use of control spectra is not limited to the case wherein a material has been introduced into a bulk following the fabrication of the bulk. More generally, the control spectra may correspond to another specimen of the same intended design as the specimen to be classified but in an earlier stage of the fabrication process thereof (in the sense that up until the earlier stage the fabrication is to the same design intent), irrespectively of whether material has been introduced into a bulk of the specimen to be classified or otherwise added to the thereto (e.g. on top of one or more previously fabricated layers of the specimen to be classified) or removed therefrom. Non-limiting example of the latter case include the removal of a layer(s) and the removal of a contaminant(s).

Even more generally, the control spectra may correspond to another specimen, which may be of a same intended design as the specimen to be classified, or, according to some embodiments, may be of a different intended design than the specimen to be classified. According to some embodiments, the control spectra may correspond to a gold-standard specimen (which may or may not be of the same intended design as the specimen to be classified). As used herein, the term "gold standard specimen" refers to a specimen having properties (e.g. the concentration(s) of target substance(s) therein and/or geometrical dimensions thereof), which have been certified to a high precision. According to some of the last two embodiments, it may not be a priori known whether a characteristic X-ray line of a target substance will manifest as a peak or a dip.

According to some embodiments, wherein a spectrometer is used to obtain the X-ray emission spectra, data analysis operation 120 may include an initial preprocessing suboperation, wherein the X-ray emission spectra may be preprocessed to remove noise.

It is to be understood that the applicability of method 100 is not limited to specimens including nominally flat layers (as depicted by way of a non-limiting example in FIGS. 2A-2D). Regions differing from one another in material composition (whether in terms of bulk material and/or an introduced material) may in principle be arbitrarily shaped. In particular, method 100 may be applied to specimens characterized by continuously varying densities of substances included therein as function of the depth coordinate and/or, in the three-dimensional case, as a function of the lateral coordinates. Further, the skilled person will readily perceive that method 100 may be applied to specimens including empty cavities and/or holes.

Specimen Classification Systems

According to an aspect of some embodiments, there is provided a computerized system for classification of specimens (such as semiconductor structures, e.g., included in patterned wafers) based on energy signature measurements. FIG. 6 schematically depicts such a system, a computerized system 600, according to some embodiments. As will be apparent from the description of system 600, system 600 may be used to implement method 100. System 600 includes an e-beam source 602, an X-ray measurement module 604 (i.e., X-ray measurement equipment), a computational module 606, and a controller 608. According to some embodiments, system 600 may further include a stage 620 (e.g., a xyz stage) configured to accommodate an (inspected) specimen 60. According to some embodiments, specimen 60 may be a patterned wafer or a structure (e.g. a semiconductor structure) included in or on a patterned wafer. According to some such embodiments, specimen 60 may be a preliminary structure in one of the fabrication stages of a patterned wafer. According to some embodiments, specimen 60 may be or include one or more memory components and/or logic components (such as a gate stack, for example, a high-k metal gate stack). It is noted that specimen 60 does not form part of system 600.

Dotted lines between elements indicate functional or communicational association there between.

E-beam source 602 is configured to produce e-beams at a plurality of e-beam landing energies. In particular, e-beam source 602 is configured to produce e-beams at each of a plurality of landing energies, so as to allow probing specimen 60 to a plurality of depths, respectively, essentially as described above in the description of suboperation 110a of method 100.

The greater the depth to which an inspected specimen is to be probed, the greater the maximum e-beam landing energy, and, optionally, the number of e-beam landing energies. The depth to which the inspected specimen is to be probed will generally depend on the distribution of each of the at least one target substance. According to some embodiments, the plurality of e-beam landing energies may include landing energies up to about 5 keV, about 10 keV, about 15 keV, about 20 keV, or even about 30 keV. Each possibility corresponds to different embodiments. In silicon an e-beam with a landing energy of about 15 keV may penetrate as deep as about 3 μm.

An e-beam 605, generated by e-beam source 602, is shown incident on (an external surface 64 of) specimen 60. As a result of the impinging of e-beam 605 on specimen 60, and the penetration of e-beam 605 into specimen 60, X-rays, and, in particular, characteristic X-rays, are generated. A portion of these X-rays, constituted by X-rays 615, arrives at X-ray measurement module 604.

According to some embodiments, X-ray measurement module 604 includes a spectrometer, which is sensitive to electromagnetic radiation in the X-ray photon energy range (at least over the characteristic X-rays regime or one or more subranges thereof). According to some such embodiments, the spectrometer may be an EDX spectrometer or a WDX spectrometer. According to some embodiments, X-ray measurement nodule 604 may include both an EDX spectrometer and a WDX spectrometer. In such embodiments the X-ray emission spectra may be obtained using both the EDX spectrometer and the WDX spectrometer with the WDX spectrometer being used to "zoom in" on the characteristic X-ray lines. In particular, the greater resolution of the WDX spectrometer (which renders it slower), as compared to the EDX spectrometer, allows obtaining narrower peaks and dips. According to some embodiments, wherein the spectrometer is a WDX spectrometer, X-ray measurement module 604 may be configured to allow scanning over extended photon energy ranges (thereby allowing to obtain X-ray emission spectra over extended photon energy ranges.) X-ray measurement module 604 is configured to relay (optionally, via controller 608) the measurement data collected thereby (e.g., the spectrum of X-rays incident thereon) to computational module 606.

According to some embodiments, X-ray measurement module 604 may additionally include a window positioned between the spectrometer and stage 620, which may be configured to controllably and differentially attenuate the spectrum of the emitted X-rays and/or protect an X-ray sensitive surface of the spectrometer.

According to some alternative embodiments, X-ray measurement module 604 is configured to measure the intensity of electromagnetic X-ray radiation (i.e., electromagnetic radiation in the X-ray photon energy range) at or about a characteristic X-ray line of a substance included in specimen 60 without additionally measuring the intensity of the electromagnetic X-ray radiation over an extended photon energy range outside the immediate vicinity of the characteristic X-ray line. According to some such embodiments, X-ray measurement module 604 may include an X-ray sensor (i.e., a sensor configured to measure X-rays) and an optical filter (not shown). The optical filter is configured to block electromagnetic radiation having a photon energy outside the immediate vicinity of the characteristic X-ray line from reaching the X-ray sensor.

According to some embodiments, system 600 may include additional elements. The additional elements may include electron optics (not shown; e.g., an electrostatic lens(es) and a magnetic deflector(s)), which may be used to guide and manipulate an e-beam generated by e-beam source 602. Additionally, or alternatively, the additional elements may include collection optics configured to guide onto X-ray measurement module 604 electromagnetic radiation generated due to the impinging of an e-beam on specimen 60 and penetration thereinto.

According to some embodiments, the additional elements may include a filter configured to block electromagnetic radiation outside characteristic X-rays regime and/or one or more subranges of thereof.

According to some embodiments, at least e-beam source 602 and stage 620 may be housed within a vacuum chamber 630. While in FIG. 6 X-ray measurement module 604 is shown positioned inside vacuum chamber 630, according to some alternative embodiments, X-ray measurement module 604 may be positioned outside vacuum chamber 630.

Controller 608 may be functionally associated with e-beam source 602 and, optionally, stage 620. More specifically, controller 608 is configured to control and synchronize operations and functions of the above-listed modules and components during probing of an inspected specimen (e.g., instruct the e-beam source to change the e-beam landing energy).

Computational module 606 may include computer hardware (one or more processors and, optionally, RAM and/or non-volatile memory components; not shown). The computer hardware is configured to process measurement data, obtained by X-ray measurement module 604, and output a classification of an inspected specimen (e.g., specimen 60 to which the measurement data pertains), essentially as described above in the Classification Methods Subsection.

More specifically, according to some embodiments, wherein the measurement data are X-ray emission spectra, computational module 606 may be configured to fit onto each of the X-ray emission spectra a respective (free) curve, thereby obtaining an optimized curve. To this end, according to some embodiments (wherein an analytic solution to the optimization problem is not available), computational module 606 may be configured to execute one or more optimization algorithms (e.g., to solve the optimization problems specified above in the description of suboperation 120a). Examples of relevant optimization algorithms include standard iterative optimization algorithms, such as gradient descent or Newton's method. According to some embodiments, customized iterative optimization algorithms—obtained by "tweaking" standard iterative optimization algorithms to account for constraints and/or to assure that a global minimum is attained—may be employed.

Computational module 606 is further configured to extract the energy signature from the optimized curves, essentially as described above in the Classification Methods Subsection.

Finally, computational module 606 is configured to classify the inspected specimen based on the measured (extracted) energy signature, essentially as described above in the description of suboperation 120b. To this end, computational module 606 may be configured to compute the distances between the measured energy signature and each of the one or more reference energy signatures, e.g., as specified above in the description of suboperation 120b. According to some embodiments, wherein the inspected specimen is to be classified to one of K≥2 classes, which correspond to the K reference specimens, respectively, the inspected specimen is classified as being in the class corresponding to the reference specimen for which minimum distance is obtained. According to some embodiments, computational module 606 may further be configured to compute the confidence of the classification.

According to some embodiments, computational module 606 may additionally be configured to obtain spectral differences by subtracting from each of the X-ray emission spectra a respective control spectrum. In such embodiments, the optimized curves are obtained by fitting onto the spectral differences, as described above in the Methods subsection. According to some embodiments, additionally or alternatively to fitting onto peaks about a characteristic X-ray line, the fitting may involve fitting onto dips about another characteristic X-ray line. In particular, according to some embodiments, it may not be a priori known whether a characteristic X-ray line of a target substance will manifest as a peak or a dip. The control spectra may correspond to X-ray emission spectra of another specimen of the same intended design as specimen 60 but in an earlier stage in a fabrication process thereof, a specimen of a different intended design than specimen 60, or a gold-standard specimen (which may or may not be of the same intended design as specimen 60). As a non-limiting example, according to some embodiments, specimen 60 may include a material introduced into a bulk of specimen 60 following the fabrication of the bulk, with the control spectra corresponding to X-ray emission spectra of the bulk.

As used herein, the terms "fitted" and "optimized" are interchangeable when employed in the context of curve fitting.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods, according to some embodiments, may be described in a specific sequence, the methods of the disclosure may include some or all of the described operations carried out in a different order. In particular, it is to be understood that the order of operations and suboperations of any of the described methods may be reordered unless the context clearly dictates otherwise, for example, when a latter operation requires as input the output of earlier operation or when a latter operation requires the product of an earlier operation. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A system for non-destructive classification of specimens, the system comprising:

an electron beam (e-beam) source configured to project e-beams on a specimen being inspected at one or more e-beam landing energies, the e-beams being configured to penetrate the inspected specimen and induce emission of X-rays;

an X-ray measurement module configured to obtain measurement data by measuring the emitted X-rays; and a computational module configured to:

process the measurement data to obtain an energy signature of at least one target substance which the inspected specimen comprises, obtaining the energy signature comprises fitting a free curve onto each of one or more obtained spectra thereby obtaining a respective optimized curve, the free curve being proportional to a bulge-shaped function or being a sum of functions comprising a bulge-shaped function, the energy signature being indicative of a dependence on the e-beam landing energy of an intensity of the emitted X-rays about each of at least one characteristic X-ray line of the at least one target substance, respectively; and classify the inspected specimen based on the measured energy signature and one or more reference energy signatures pertaining to one or more reference specimens, respectively;

wherein:

(i) the one or more obtained spectra are the measured X-ray emission spectra, respectively, the computational module being further configured to fit the bulge-shaped function onto a peak about the characteristic X-ray line; or (ii) the computational module is further configured to, for each e-beam landing energy, compute a spectral difference between the respective measured X-ray emission spectrum and a respective control spectrum, and the obtained spectra are the spectral differences, respectively, the computational module is further configured to fit the bulge-shaped function onto a peak or a dip about the characteristic X-ray line.

2. The system of claim 1, wherein the one or more reference energy signatures pertain to two or more reference specimens, and wherein the computational module is configured to classify the inspected specimen as;

(i) being in one of two or more classes, each corresponding to a respective one of the reference specimens, or (ii) being in either one of the two or more classes, each corresponding to a respective one of the reference specimens, or being in an additional class not corresponding to any of the reference specimens; or wherein the computational module is configured to classify the inspected specimen as being in a same class one of the one or more reference specimens or not being in any one of the classes.

3. The system of claim 2, wherein each of the control spectra is that of a gold standard specimen, or that of another specimen having an intended designed which is the same intended design as that of the inspected specimen and being in an earlier stage in a fabrication process thereof.

4. The system of claim 1, wherein, in order to classify the inspected specimen, the computational module is configured to compute one or more distances between the measured energy signature and the one or more reference energy signatures, respectively.

5. The system of claim 1, wherein the X-ray measurement module is configured to measure at least one spectrum of the emitted X-rays in at least one photon energy range comprising at least one characteristic X-ray line of the at least one target substance, respectively.

6. The system of claim 5, wherein the X-ray measurement module comprises one or more energy-dispersive X-ray spectrometers and/or one or more wavelength-dispersive X-ray spectrometers.

7. The system of claim 1, wherein the one or more obtained spectra are the measured X-ray emission spectra, respectively, wherein the sum of functions further comprises a second function, which is a polynomial, and wherein the computational module is further configured to fit the second function onto a bremsstrahlung component of the respective measured X-ray emission spectrum.

8. The system of claim 7, wherein N is a number of the at least one e-beam landing energy and M is a number of the at least one target substance;

wherein the computational module is configured to, from each of the fitted bulge-shaped functions, determine an intensity of the emitted X-rays about the respective characteristic X-ray line; and wherein the energy signature is an M·N component vector with components thereof constituted by (i) M·N computed intensity values, respectively, or (ii) M·N functions, each function depending on a respective one of the M·N computed intensity values and, when the one or more obtained spectra are the measured X-ray emission spectra, respectively, also the fitted parameters of the respective second function.

9. The system of claim 8, wherein the computational module is configured to compute each of the M·N intensity values by minimizing: (i) M·N cost functions, each cost function comprising a distance between the respective obtained spectrum and the respective free curve, the minimization being over adjustable parameters of the free curve, or (ii) a cost function comprising a sum of M·N distances between the M·N obtained spectra and the M·N free curves, respectively, the minimization being joint over adjustable parameters of the free curve.

10. The system of claim 1, wherein the at least one target substance comprises at least one semiconductor material, and/or wherein the inspected specimen is a patterned wafer.

11. A computer-based method for non-destructive classification of specimens, the method comprising:

a measurement operation comprising, for each of at least one e-beam landing energy, suboperations of:

projecting an e-beam on an inspected specimen, the e-beam being configured to penetrate the inspected specimen to a degree dependent on the e-beam landing energy; and obtaining measurement data by measuring X-rays emitted from the inspected specimen due to the penetration of the e-beam; and a data analysis operation comprising suboperations of:

processing the measurement data to obtain an energy signature of at least one target substance which the inspected specimen comprises, obtaining the energy signature comprises fitting a free curve onto each of one or more obtained spectra thereby obtaining a respective optimized curve, the free curve being proportional to a bulge-shaped function or being a sum of functions comprising a bulge-shaped function, the energy signature being indicative of a dependence on the e-beam landing energy of an intensity of the emitted X-rays about each of at least one characteristic X-ray line of the at least one target substance, respectively; and classifying the inspected specimen based on the measured energy signature and one or more reference energy signatures pertaining to one or more reference specimens, respectively;

wherein:
(i) the one or more obtained spectra are the measured X-ray emission spectra, respectively, the bulge-shaped function being fitted onto a peak about the characteristic X-ray line; or (ii) for each e-beam landing energy a spectral difference between the respective measured X-ray emission spectrum and a respective control spectrum is computed, and the one or more obtained spectra are the spectral differences, respectively, the bulge-shaped function being fitted onto a peak or a dip about the characteristic X-ray line.

12. The method of claim 11, wherein the one or more reference energy signatures pertain to two or more reference specimens, and wherein, in the suboperation of classifying the inspected specimen, the inspected specimen is classified as:
(i) being in two or more classes, each corresponding to a respective one of the reference specimens, or (ii) being in either one of the two or more classes, each corresponding to a respective one of the reference specimens, or being in an additional class not corresponding to any of the reference specimens; or wherein, in the suboperation of classifying the inspected specimen, the inspected specimen is classified as being in a same class as one of the one or more reference specimens or not being in any of the classes.

13. The method of claim 11, wherein the one or more reference energy signatures are generated based on reference data obtained by:
profiling one or more groups of specimens, each group comprising specimens of a same respective design intent; and/or simulating one or more specimens of one or more design intents, respectively.

14. The method of claim 11, wherein the suboperation of classifying the inspected specimen comprises computing one or more distances between the measured energy signature and the one or more reference energy signatures, respectively.

15. The method of claim 11, wherein the one or more obtained spectra are the measured X-ray emission spectra, respectively, wherein the sum of functions further comprises a second function, which is a polynomial, and, wherein in the fitting of the free curve the second function is fitted onto a bremsstrahlung component of the respective X-ray emission spectrum.

16. The method of claim 15, wherein N is a number of the at least one e-beam landing energy and M is a number of the at least one target substance;
wherein, in the suboperation of processing the measurement data, from each of the fitted bulge-shaped functions an intensity of the emitted X-rays about the respective characteristic X-ray line is determined; and wherein the energy signature is an M·N component vector with components thereof constituted by (i) M·N computed intensity values, respectively, or (ii) M·N functions, each function depending on a respective one of the M·N computed intensity values and, when the one or more obtained spectra are the measured X-ray emission spectra, respectively, also the fitted parameters of the respective second function.

* * * * *